US010683801B2

(12) United States Patent
Huntington et al.

(10) Patent No.: US 10,683,801 B2
(45) Date of Patent: *Jun. 16, 2020

(54) SYSTEM AND METHOD FOR OXIDANT COMPRESSION IN A STOICHIOMETRIC EXHAUST GAS RECIRCULATION GAS TURBINE SYSTEM

(71) Applicants: General Electric Company, Schenectady, NY (US); ExxonMobil Upstream Research Company, Spring, TX (US)

(72) Inventors: Richard A. Huntington, Houston, TX (US); Franklin F. Mittricker, Jamul, CA (US); Loren K. Starcher, Sugar Land, TX (US); Sulabh K. Dhanuka, Houston, TX (US); Dennis M. O'Dea, Somerset, NJ (US); Samuel D. Draper, Simpsonville, SC (US); Christian M. Hansen, Greenville, SC (US); Todd Denman, Greenville, SC (US); James A. West, Liberty Township, OH (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 550 days.

This patent is subject to a terminal disclaimer.

(21) Appl. No.: 15/456,957

(22) Filed: Mar. 13, 2017

(65) Prior Publication Data
US 2017/0184021 A1 Jun. 29, 2017

Related U.S. Application Data

(63) Continuation of application No. 14/066,579, filed on Oct. 29, 2013, now Pat. No. 9,599,070.

(Continued)

(51) Int. Cl.
*F02C 1/00* (2006.01)
*F02C 3/34* (2006.01)
(Continued)

(52) U.S. Cl.
CPC .............. *F02C 3/34* (2013.01); *B01D 53/265* (2013.01); *B01D 53/94* (2013.01); *F01D 15/10* (2013.01);
(Continued)

(58) Field of Classification Search
CPC .............. F02C 3/34; F02C 1/08; F02C 1/005
See application file for complete search history.

(56) References Cited

U.S. PATENT DOCUMENTS 2,488,911 A 11/1949 Hepburn et al.
2,669,092 A 2/1954 Hammaren
(Continued)

FOREIGN PATENT DOCUMENTS

CA 2231749 9/1998
CA 2645450 9/2007
(Continued)

OTHER PUBLICATIONS

Cho, J. H. et al. (2005) "Marrying LNG and Power Generation," Energy Markets; 10, 8; ABI/INFORM Trade & Industry, 5 pgs.
(Continued)

*Primary Examiner* — Gerald L Sung
(74) *Attorney, Agent, or Firm* — Fletcher Yoder, P.C

(57) ABSTRACT

A system includes a gas turbine system having a turbine combustor, a turbine driven by combustion products from the turbine combustor, and an exhaust gas compressor driven by the turbine. The exhaust gas compressor is configured to compress and supply an exhaust gas to the turbine combustor. The gas turbine system also has an exhaust gas recirculation (EGR) system. The EGR system is configured
(Continued)

to recirculate the exhaust gas along an exhaust recirculation path from the turbine to the exhaust gas compressor. The system further includes a main oxidant compression system having one or more oxidant compressors. The one or more oxidant compressors are separate from the exhaust gas compressor, and the one or more oxidant compressors are configured to supply all compressed oxidant utilized by the turbine combustor in generating the combustion products.

20 Claims, 24 Drawing Sheets

Related U.S. Application Data

(60) Provisional application No. 61/747,192, filed on Dec. 28, 2012, provisional application No. 61/722,118, filed on Nov. 2, 2012, provisional application No. 61/722,115, filed on Nov. 2, 2012, provisional application No. 61/722,114, filed on Nov. 2, 2012, provisional application No. 61/722,111, filed on Nov. 2, 2012.

(51) Int. Cl.
F02C 3/107 (2006.01)
F02C 7/36 (2006.01)
F02M 26/28 (2016.01)
B01D 53/26 (2006.01)
B01D 53/94 (2006.01)
F01D 15/10 (2006.01)
F01D 15/12 (2006.01)
F01K 7/16 (2006.01)
F01K 23/10 (2006.01)
F02C 3/04 (2006.01)
F02C 6/18 (2006.01)
F02C 9/50 (2006.01)

(52) U.S. Cl.
CPC ............ *F01D 15/12* (2013.01); *F01K 7/16* (2013.01); *F01K 23/101* (2013.01); *F02C 3/04* (2013.01); *F02C 3/107* (2013.01); *F02C 6/18* (2013.01); *F02C 7/36* (2013.01); *F02C 9/50* (2013.01); *F02M 26/28* (2016.02); *F05D 2220/32* (2013.01); *F05D 2220/72* (2013.01); *F05D 2220/76* (2013.01); *F05D 2240/60* (2013.01); *F05D 2260/205* (2013.01); *F05D 2260/211* (2013.01); *F05D 2260/40311* (2013.01); *Y02E 20/16* (2013.01); *Y02T 50/676* (2013.01)

(56) References Cited

U.S. PATENT DOCUMENTS

| | | |
|---|---|---|
| 2,884,758 A | 5/1959 | Oberle |
| 3,500,636 A | 3/1970 | Craig |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |

(56) References Cited

U.S. PATENT DOCUMENTS

| | | |
|---|---|---|
| 5,444,971 A | 8/1995 | Holenberger |
| 5,457,951 A | 10/1995 | Johnson |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,553,448 A | 9/1996 | Farrell et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,622,044 A | 4/1997 | Bronicki et al. |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,752 A | 10/1997 | Skog |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,012,279 A | 1/2000 | Hines |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen |
| 6,370,870 B1 | 4/2002 | Kamijo et al. |
| 6,374,591 B1 | 4/2002 | Johnson |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |

(56) References Cited

U.S. PATENT DOCUMENTS

| | | |
|---|---|---|
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Bane et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |

(56) References Cited

U.S. PATENT DOCUMENTS

| | | |
|---|---|---|
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 8,726,628 B2 | 5/2014 | Wichmann et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0026745 A1* | 2/2005 | Mitrovic ............ F16H 1/2836 475/348 |

(56) References Cited

U.S. PATENT DOCUMENTS

| | | |
|---|---|---|
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0235625 A1 | 10/2005 | Gericke et al. |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0104939 A1 | 5/2008 | Hoffmann et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1* | 11/2009 | Anand ............... B01D 53/8625 290/52 |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1* | 4/2012 | Wichmann ............... F01K 23/10 60/801 |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Angelyn et al. |
| 2014/0182302 A1 | 7/2014 | Angelyn et al. |
| 2014/0182303 A1 | 7/2014 | Angelyn et al. |

(56) References Cited

U.S. PATENT DOCUMENTS

| | | |
|---|---|---|
| 2014/0182304 A1 | 7/2014 | Angelyn et al. |
| 2014/0182305 A1 | 7/2014 | Angelyn et al. |
| 2014/0196464 A1 | 7/2014 | Biyani et al. |
| 2014/0216011 A1 | 8/2014 | Muthaiah et al. |
| 2015/0000292 A1 | 1/2015 | Subramaniyan |
| 2015/0000293 A1 | 1/2015 | Thatcher et al. |
| 2015/0000294 A1 | 1/2015 | Minto et al. |
| 2015/0000299 A1 | 1/2015 | Zuo et al. |
| 2015/0033748 A1 | 2/2015 | Vaezi |
| 2015/0033749 A1 | 2/2015 | Slobodyanskiy et al. |
| 2015/0033751 A1 | 2/2015 | Andrew |
| 2015/0033757 A1 | 2/2015 | White et al. |
| 2015/0040574 A1 | 2/2015 | Wichmann et al. |
| 2015/0059350 A1 | 3/2015 | Kolvick et al. |
| 2015/0075171 A1 | 3/2015 | Sokolov et al. |
| 2015/0152791 A1 | 6/2015 | White |
| 2015/0198089 A1 | 7/2015 | Muthaiah et al. |
| 2015/0204239 A1 | 7/2015 | Minto et al. |
| 2015/0214879 A1 | 7/2015 | Huntington et al. |
| 2015/0226133 A1 | 8/2015 | Minto et al. |
| 2015/0308293 A1 | 10/2015 | Huntington et al. |
| 2015/0330252 A1 | 11/2015 | Manchikanti et al. |
| 2015/0377140 A1 | 12/2015 | Rittenhouse et al. |
| 2015/0377146 A1 | 12/2015 | Della-Fera et al. |
| 2015/0377148 A1 | 12/2015 | Minto et al. |

FOREIGN PATENT DOCUMENTS

| | | |
|---|---|---|
| CA | 2828278 A1 | 9/2012 |
| CN | 101230798 A | 7/2008 |
| CN | 102454481 A | 5/2012 |
| DE | 2731387 A1 | 1/1978 |
| EP | 0769098 A1 | 4/1997 |
| EP | 0770771 | 5/1997 |
| EP | 1362984 A2 | 11/2003 |
| EP | 1591644 A1 | 11/2005 |
| GB | 0776269 | 6/1957 |
| GB | 2117053 | 10/1983 |
| JP | S53-001738 | 1/1978 |
| JP | H9-151750 | 6/1997 |
| JP | S61-113196 U | 10/1998 |
| JP | 2012092833 A | 5/2012 |
| RU | 2094636 C1 | 10/1997 |
| TW | 201217637 A | 5/2012 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | 2012003079 A1 | 1/2012 |
| WO | WO2012003489 | 1/2012 |
| WO | 2012128923 A2 | 9/2012 |
| WO | 2012128926 A2 | 9/2012 |
| WO | WO2012128928 | 9/2012 |
| WO | WO2012128929 | 9/2012 |
| WO | 2012170114 A1 | 12/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | WO2014133406 | 9/2014 |

OTHER PUBLICATIONS

Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.

Nanda, R. et al. (2007) "Utilizing Air Based Technologies as Heat Source for LNG Vaporization," presented at the 86th Annual convention of the Gas Processors of America (GPA 2007), San Antonio, TX; 13 pgs.

Rosetta, M. J. et al. (2006) "Integrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.

SG Search Report & Written Opinion; Application No. SG 11201503406V; dated Oct. 19, 2016; 14 pages.

CN First Office Action and English Translation; Application No. CN 201380057100.1; dated May 16, 2016; 48 pages.

PCT International Search Report and Written Opinion for PCT/US2013/067803 dated May 26, 2014.

GCC Office Action/Examination Report for GC Application No. 2013-25695 dated Nov. 22, 2017; 6 pgs.

Russian Office Action for RU Application No. 2015120738 dated Oct. 19, 2017; 17 Pages.

Singapore Written Opinion for SG Application No. 11201503406V dated Nov. 6, 2017; 9 Pages.

Singapore Examination Report for SG Application No. 11201503406V dated Oct. 1, 2018.

Japanese Notice of Allowance for JP Application No. 2015-540786 dated Oct. 3, 2018.

Taiwan Notice of Allowance for TW Application No. 102138893 dated Nov. 19, 2018.

Australian Examination Report for AU Application No. 2013337830 dated Mar. 8, 2017; 3 Pages.

Taiwanese Office Action for TW Application No. 102138893 dated Jun. 13, 2017; 11 Pages.

Chinese Office Action for CN Application No. 201380057100.1 dated Jun. 16, 2017; 5 Pages.

Japanese Office Action for JP Application No. 2015-540786 dated Aug. 28, 2017, 8 pgs.

U.S. Appl. No. 14/771,450, filed Feb. 28, 2013, Valeev et al.

U.S. Appl. No. 14/599,750, filed Jan. 19, 2015, O'Dea et al.

Ahmed, S. et al. (1998) "Catalytic Partial Oxidation Reforming of Hydrocarbon Fuels," 1998 Fuel Cell Seminar, 7 pgs.

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.

Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.

BP Press Release (2006) "BP and Edison Mission Group Plan Major Hydrogen Power Project for California," www.bp.com/hydrogenpower, 2 pgs.

Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, 42 pgs.

Foy, Kirsten et al. (2005) "Comparison of Ion Transport Membranes" Fourth Annual Conference on Carbon Capture and Sequestration, DOE/NETL; 11 pgs.

Ciulia, Vincent. (2001-2003) "Auto Repair. How the Engine Works," http://autorepair.about.com/cs/generalinfo/a/aa060500a.htm, 1 page.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers" Chem. Eng. Prog. Symp. Ser., 55 (21), 12 pgs.

(56) References Cited

OTHER PUBLICATIONS

Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US), 7 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
Chinese Office Action for CN Application No. 2018101168421 dated Dec. 2, 2019; 12 Pages.
Japanese Office Action for JP Application No. 2018-221845 dated Oct. 9, 2019, 6 pages.
EP Communication Pursuant to Article 94(3) EPC; Application No. EP 13789458.0; dated Apr. 30, 2018; 5 pages.
EP Communication Pursuant to Article 94(3) EPC; Application No. EP 13789458.0; dated Sep. 13, 2019; 4 pages.
Canadian Office Action for CA Application No. 2,890,088 dated Nov. 22, 2019, 5 pages.

\* cited by examiner

SYSTEM AND METHOD FOR OXIDANT COMPRESSION IN A STOICHIOMETRIC EXHAUST GAS RECIRCULATION GAS TURBINE SYSTEM

CROSS-REFERENCE TO RELATED APPLICATIONS

This application claims is a continuation of U.S. patent application Ser. No. 14/066,579, which claims priority to and benefit of U.S. Provisional Patent Application No. 61/747,192, entitled "SYSTEM AND METHOD FOR OXIDANT COMPRESSION IN A STOICHIOMETRIC EXHAUST GAS RECIRCULATION GAS TURBINE SYSTEM," filed on Dec. 28, 2012, U.S. Provisional Patent Application No. 61/722,118, entitled "SYSTEM AND METHOD FOR DIFFUSION COMBUSTION IN A STOICHIOMETRIC EXHAUST GAS RECIRCULATION GAS TURBINE SYSTEM," filed on Nov. 2, 2012, U.S. Provisional Patent Application No. 61/722,115, entitled "SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM," filed on Nov. 2, 2012, U.S. Provisional Patent Application No. 61/722,114, entitled "SYSTEM AND METHOD FOR DIFFUSION COMBUSTION WITH OXIDANT-DILUENT MIXING IN A STOICHIOMETRIC EXHAUST GAS RECIRCULATION GAS TURBINE SYSTEM," filed on Nov. 2, 2012, and U.S. Provisional Patent Application No. 61/722,111, entitled "SYSTEM AND METHOD FOR LOAD CONTROL WITH DIFFUSION COMBUSTION IN A STOICHIOMETRIC EXHAUST GAS RECIRCULATION GAS TURBINE SYSTEM," filed on Nov. 2, 2012, all of which are herein incorporated by reference in their entirety for all purposes.

BACKGROUND

The subject matter disclosed herein relates to gas turbine engines.

Gas turbine engines are used in a wide variety of applications, such as power generation, aircraft, and various machinery. Gas turbine engine generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. Gas turbine engines generally include a compressor that compresses the oxidant, along with one or more diluent gases. Unfortunately, controlling the flux of oxidant and diluent gas into the combustor section in this manner can impact various exhaust emission and power requirements. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine system, which includes a turbine combustor; a turbine driven by combustion products from the turbine combustor; and an exhaust gas compressor driven by the turbine, wherein the exhaust gas compressor is configured to compress and supply an exhaust gas to the turbine combustor; and an exhaust gas recirculation (EGR) system, wherein the EGR system is configured to recirculate the exhaust gas along an exhaust recirculation path from the turbine to the exhaust gas compressor. The system also includes a main oxidant compression system configured to supply compressed oxidant to the gas turbine system, and the main oxidant compression system includes: a first oxidant compressor; and a first gearbox configured to enable the first oxidant compressor to operate at a first speed different from a first operating speed of the gas turbine system.

In a second embodiment, a system includes a gas turbine system, having: a turbine combustor; a turbine driven by combustion products from the turbine combustor; and an exhaust gas compressor driven by the turbine, wherein the exhaust gas compressor is configured to compress and supply an exhaust gas to the turbine combustor. The gas turbine system also includes an exhaust gas recirculation (EGR) system, wherein the EGR system is configured to recirculate the exhaust gas along an exhaust recirculation path from the turbine to the exhaust gas compressor. The system also includes a main oxidant compression system configured to supply compressed oxidant to the gas turbine system, and the main oxidant compression system has a first oxidant compressor; and a second oxidant compressor, wherein the first and second oxidant compressors are driven by the gas turbine system.

In a third embodiment, a system, includes a gas turbine system, having: a turbine combustor; a turbine driven by combustion products from the turbine combustor; and an exhaust gas compressor driven by the turbine, wherein the exhaust gas compressor is configured to compress and supply an exhaust gas to the turbine combustor; and an exhaust gas recirculation (EGR) system, wherein the EGR system is configured to recirculate the exhaust gas along an exhaust recirculation path from the turbine to the exhaust gas compressor. The system also includes a main oxidant compression system configured to supply compressed oxidant to the gas turbine system, and the main oxidant compression system comprises one or more oxidant compressors; a heat recovery steam generator (HRSG) coupled to the gas turbine system, wherein the HRSG is configured to generate steam by transferring heat from the exhaust gas to a feed water, and the exhaust recirculation path of the EGR system extends through the HRSG; and a steam turbine disposed along a shaft line of the gas turbine system and at least partially driven by the steam from the HRSG, wherein the steam turbine is configured to return condensate as at least a portion of the feedwater to the HRSG.

In a fourth embodiment, a system includes: a gas turbine system, having: a turbine combustor; a turbine driven by combustion products from the turbine combustor; and an exhaust gas compressor driven by the turbine, wherein the exhaust gas compressor is configured to compress and supply an exhaust gas to the turbine combustor; and an exhaust gas recirculation (EGR) system, wherein the EGR system is configured to recirculate the exhaust gas along an exhaust recirculation path from the turbine to the exhaust gas compressor. The system also includes a main oxidant compression system comprising one or more oxidant compressors, wherein the one or more oxidant compressors are separate from the exhaust gas compressor, and the one or more oxidant compressors are configured to supply all compressed oxidant utilized by the turbine combustor in generating the combustion products.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
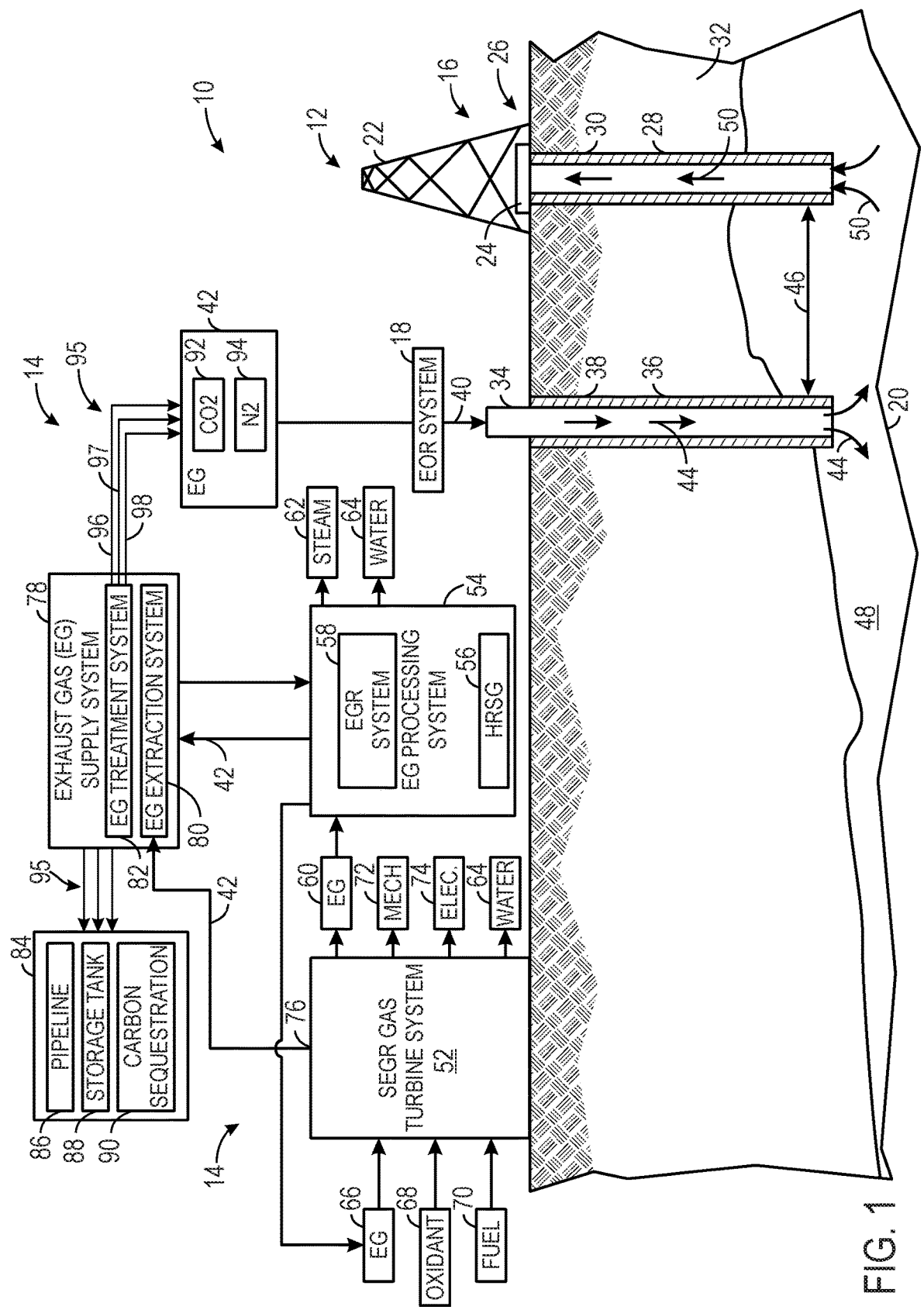
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

Furthermore, the gas turbine engines may be configured to utilize a separate main oxidant compression system for oxidant compression, rather than or in addition to utilizing the compressor of the gas turbine for such compression. The use of a separate main oxidant compression system can controllably and reliably produce oxidant at desired flow rates, temperatures, pressures, and the like, which in turn helps to enhance the efficiency of combustion and the operation of various components of a turbine-based system. The turbine-based systems may, in turn, reliably and controllably produce exhaust gas having various desired parameters (e.g., composition, flow rate, pressure, temperature) for further use in a downstream process. Possible target systems include pipelines, storage tanks, carbon sequestration systems, and hydrocarbon production systems, such as enhanced oil recovery (EOR) systems.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, Hz, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
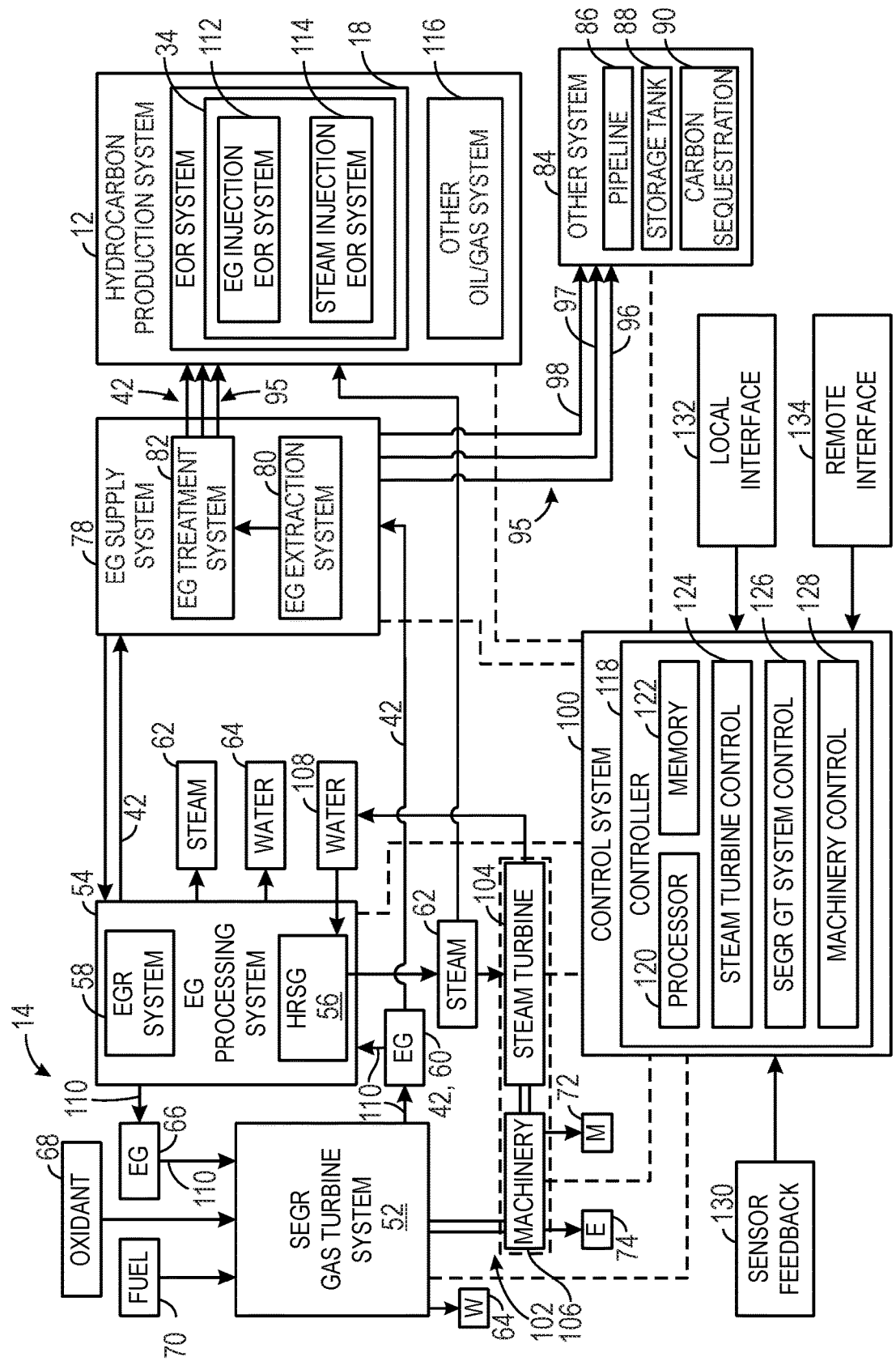
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
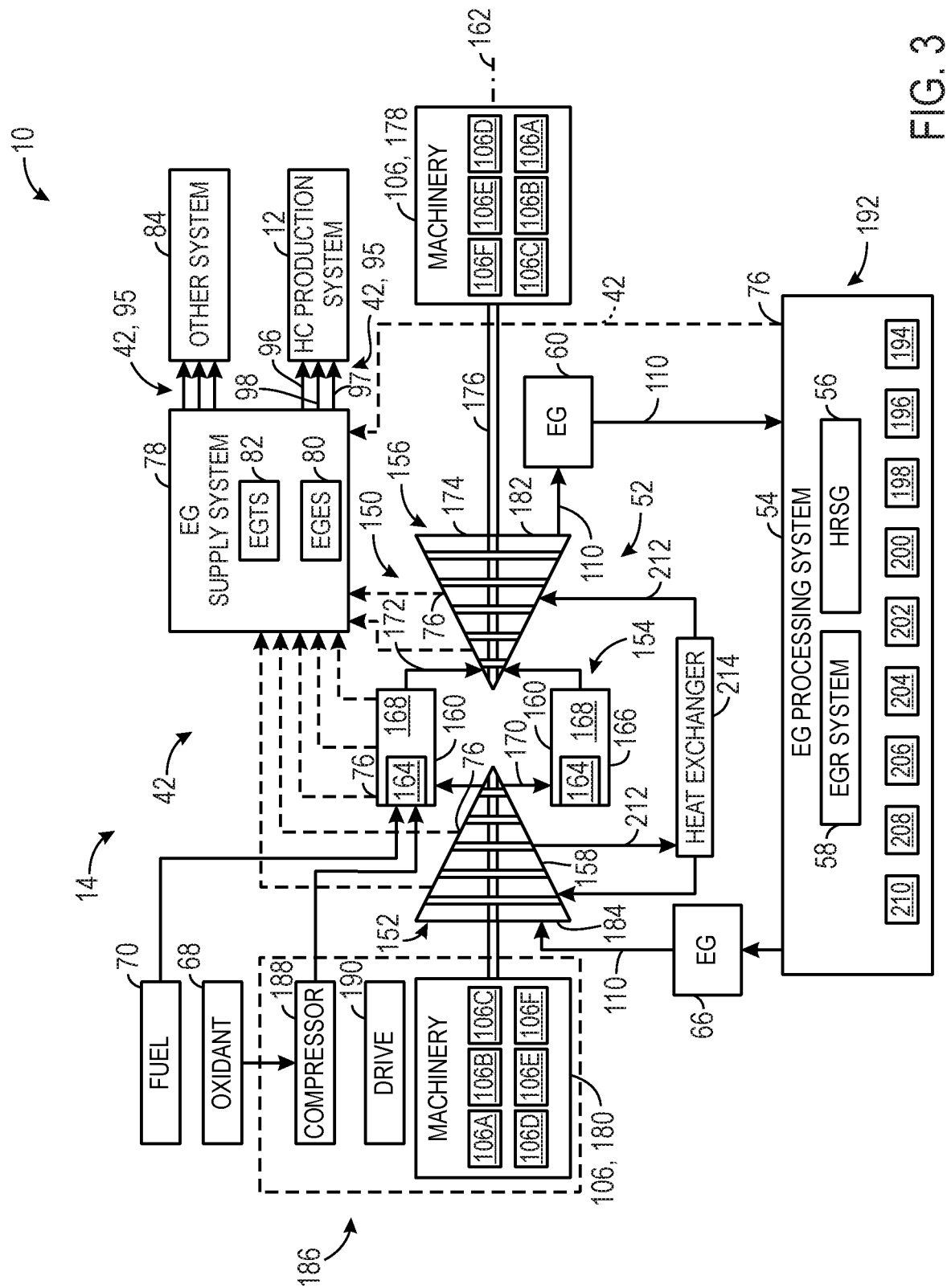
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX CLR | LP MOC | GEN | | |
| HP MOC | GBX CLR | LP MOC | GBX | GEN | |
| HP MOC | GBX HTR | LP MOC | GEN | | |

TABLE 1-continued

| 106A | 106B | 106C | 106D | 106E | 106F |
|------|------|------|------|------|------|
|      | STGN |      |      |      |      |
| MOC  | GEN  | DRV  |      |      |      |
| MOC  | DRV  | GEN  |      |      |      |
| DRV  | MOC  | GEN  |      |      |      |
| DRV  | CLU  | MOC  | GEN  |      |      |
| DRV  | CLU  | MOC  | GBX  | GEN  |      |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|-----|-----|-----|-----|-----|-----|-----|-----|-----|
| CU  | HRU | BB  | MRU | PRU |     |     |     |     |
| CU  | HRU | HRU | BB  | MRU | PRU | DIL |     |     |

TABLE 2-continued

| 194 | 196 | 198 | 200 | 202 | 204 | 206 | 208 | 210 |
|---|---|---|---|---|---|---|---|---|
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
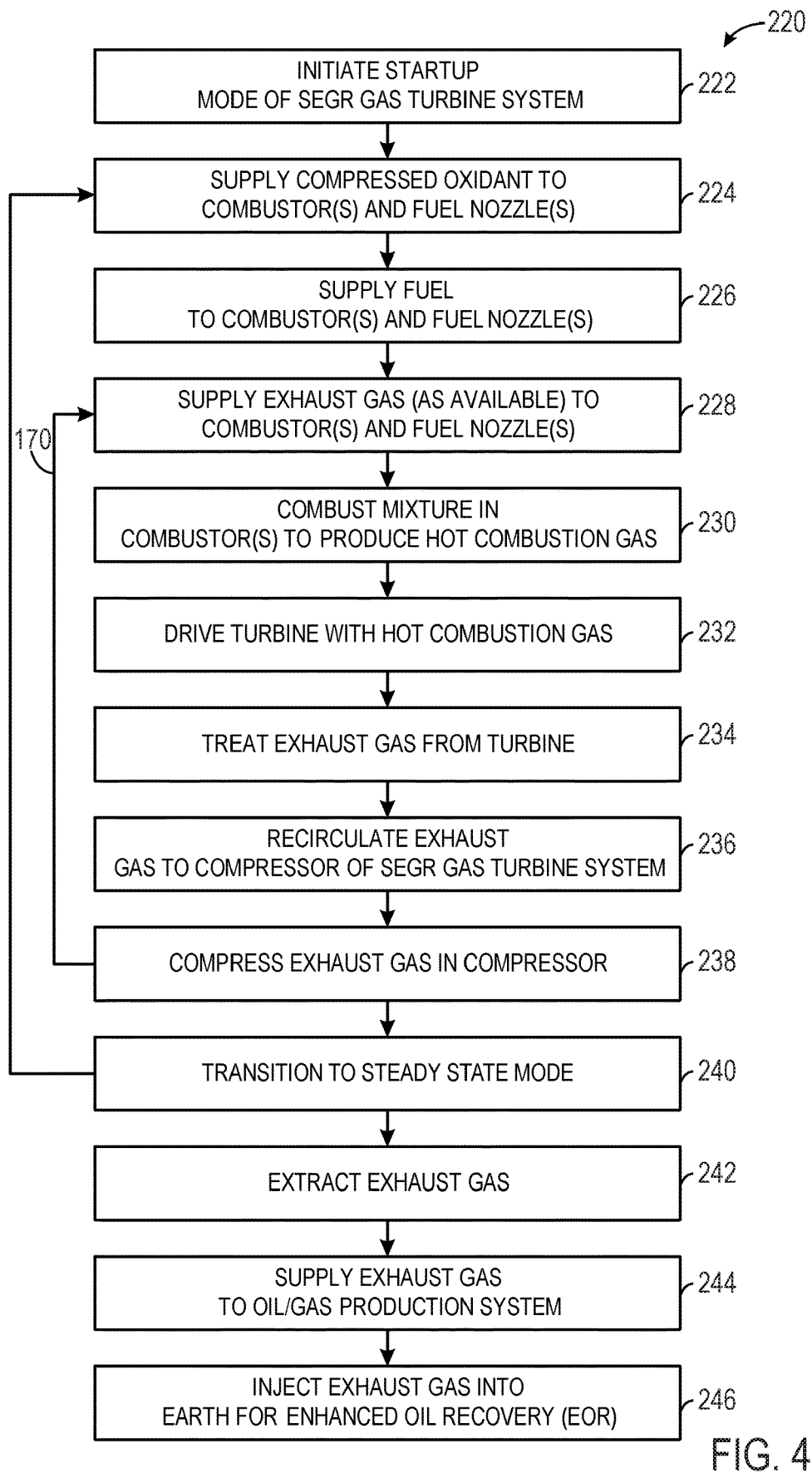
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As discussed in detailed above with respect to FIGS. 1-4, the SEGR gas turbine system 52 utilizes a combination of the fuel 70 and compressed oxidant 68 for combustion to generate exhaust gas 42. Again, the exhaust gas 42 generated by the SEGR gas turbine system 52 is provided to either or both of the EG processing system 54 and the EG supply system 78 for recirculation back to the SEGR gas turbine system 52 or the hydrocarbon production system 12 (FIG. 1). As also discussed above with respect to FIG. 3, the oxidant compression system 186 is fluidly coupled to the SEGR gas turbine engine 150, and provides the oxidant 68 in compressed form for combustion. The particular configuration of the oxidant compression system 186 may have a direct impact on the overall cycle efficiency of the SEGR gas turbine system 52. Indeed, any one or a combination of the components of the machinery 106 discussed above in TABLE 1 may be utilized to enhance the efficiency of the operation of the oxidant compression system 186, in turn enhancing the efficiency of the entire process of compression, combustion and exhaust gas generation. By way of non-limiting example, the oxidant compression system 186 may include features for rejecting heat generated during compression, generating electrical power from surplus energy generated by the SEGR gas turbine engine 150, and extracting power in the form of electrical and/or mechanical energy for driving units that may operate in series or parallel. FIGS. 5-23 provide a number of embodiments directed toward enhancing the efficiency of the operation of the oxidation compression system 186.

It should be noted that certain features of the turbine-based service system 14 have been omitted for clarity, including the control system 100 having the SEGR GT system control 126 and machinery control 128. Accordingly, it should be noted that all of the embodiments discussed below may be partially or completely controlled by the control system 100, with the control system 100 using sensor feedback 130 obtained from sensors disposed on any one or a combination of the components of the oxidant compression system 186 described below. Indeed, such sensor feedback 130 may enable synchronous operation of the machinery 106 so as to enhance the efficiency of each machine component and, therefore, at least the oxidant compression system 186.

Moving now to FIG. 5, one embodiment of the oxidant compression system 186 is illustrated as including a main oxidant compressor (MOC) 300, the particular configuration of which is discussed in further detail below. The MOC 300 is coupled to a generator 302 (e.g., a double-ended generator), which is directly driven by the SEGR GT system 52. During operation, the main oxidant compressor 300 receives the oxidant 68, and is driven by the generator 302 to compress the oxidant 68 to produce a compressed oxidant 304. At the same time, the generator 302, driven by the SEGR GT system 52, produces electric power 74. The electric power 74 may be used in a number of ways. For example, the electric power 74 may be provided to an electric power grid, or utilized by an additional component of the machinery 106 operating in parallel to the generator 302.

In particular, the generator 302 and the MOC 300 are disposed along a shaft line 306 of the SEGR GT system 52, which may also be referred to as a "train" of the SEGR GT system 52. In the illustrated embodiment, the generator 302 has an input shaft 308 that receives power from the shaft 176 of the SEGR GT system 52, and an output shaft 310 that provides input power to the MOC 300 for oxidant compression at a particular flow rate, pressure, and temperature. That is, the output shaft 310 of the generator 302 is, or is coupled to, an input shaft 312 of the MOC 300. Indeed, while certain embodiments discussed below are described as having an output shaft "coupled to" or "mechanically coupled to" an input shaft, to facilitate description, this is also intended to denote embodiments where the output shaft of a certain component is the input shaft for another component (i.e., the input shafts and the output shafts may be the same component or different components). Thus, in the illustrated embodiment, while the output shaft 310 of the generator 302 is presently described as being coupled to the input shaft 312 of the MOC 300, this is also intended to refer to a configuration in which the output shaft 310 of the generator 302 and the input shaft 312 of the MOC 300 are the same. In other words, the output shaft 310 and the input shaft 312 may be the same component, or may be different components.

Figure 5:
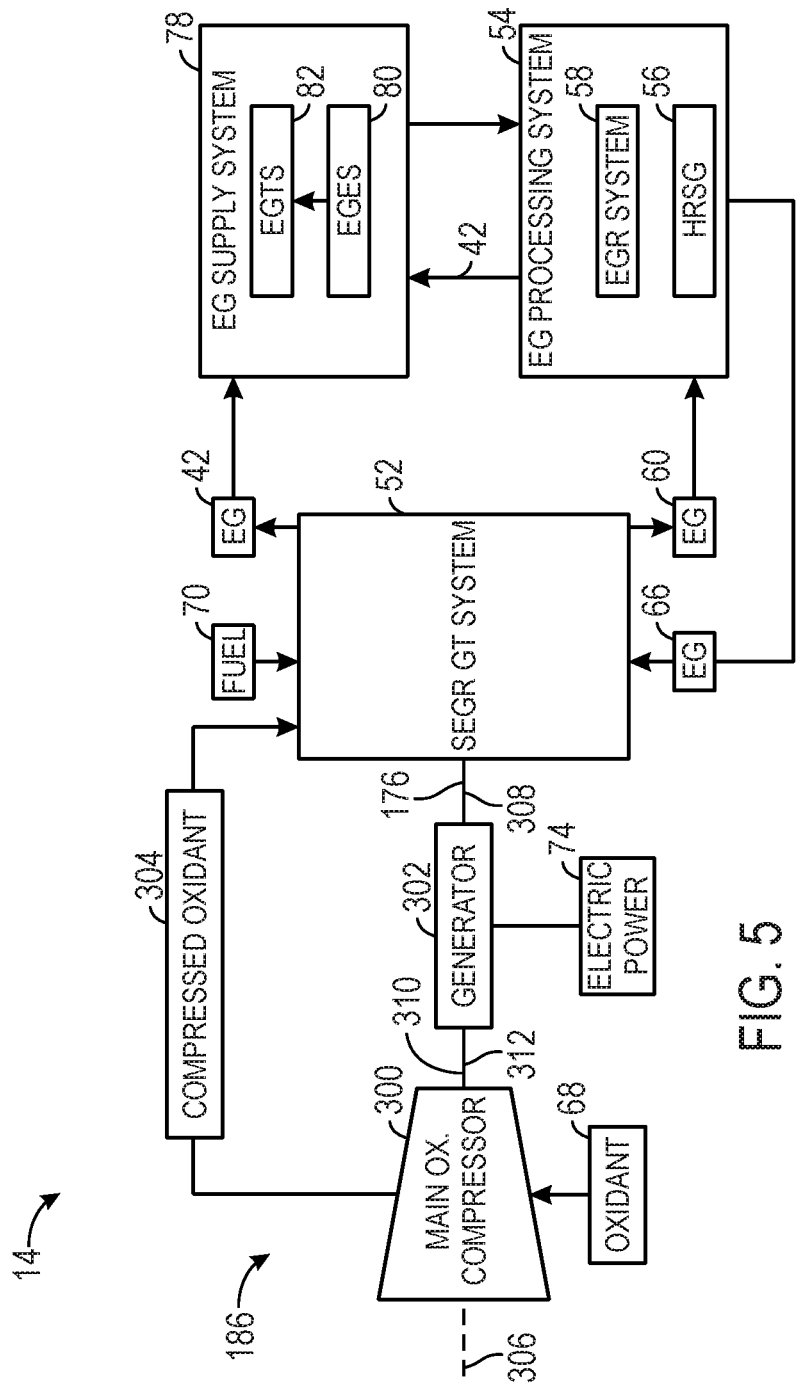
FIG. 5 is a diagram of an embodiment of the oxidant compression system of FIG. 3 having a main oxidant compressor indirectly driven by the SEGR GT system via an electrical generator.

Further, while the MOC 300 is illustrated in the embodiment of FIG. 5 as an axial flow compressor, the MOC 300 may have any suitable compressor configuration capable of generating the compressed oxidant 304 at desired operational states (e.g., pressure, temperature). Generally, the MOC 300, and any of the compressors discussed in detail below, may include one or more rows of rotating and/or stationary blading to form compression stages, which may be axial and/or radial. In some embodiments, the MOC 300 may, additionally or alternatively, include one or more radial compressor stages, such as centrifugal impellers. For example, the MOC 300 may include a series of axial flow stages followed by a series of radial flow stages. Such a configuration may be referred to as an axi-radial or axial-radial compressor. In still further embodiments, the MOC 300 may include only radial stages. In such an embodiment, the MOC 300 may be a centrifugal compressor. Thus, the MOC 300, while illustrated as a single unit housed in a single compressor casing, may actually include one, two, three or more stages housed in one, two, three or more compressor casings, with or without cooling features disposed between the cooling stages. It should be noted that the MOC 300, when in an axial flow configuration, may enable the production of the compressed oxidant 304 at high discharge temperatures and at a relatively high efficiency without the use of interstage cooling. Therefore, in one embodiment, the MOC 300 does not include interstage cooling.

It should also be noted that in the embodiment illustrated in FIG. 5, the output shaft 310 of the generator 302 may be designed to deliver the full power used by the MOC 300 to generate the compressed oxidant 304 at the desired conditions. The shaft 310 may therefore have a relatively large diameter when compared to a typical electrical generator having a similar capacity. By way of non-limiting example, the diameter of the shaft 310 of the generator 302 may be between approximately 40% and 120% of the diameter of the shaft 176 of the SEGR GT system 52, such as between approximately 60% and 100%, or between approximately 80% and 90%.

Figure 6:
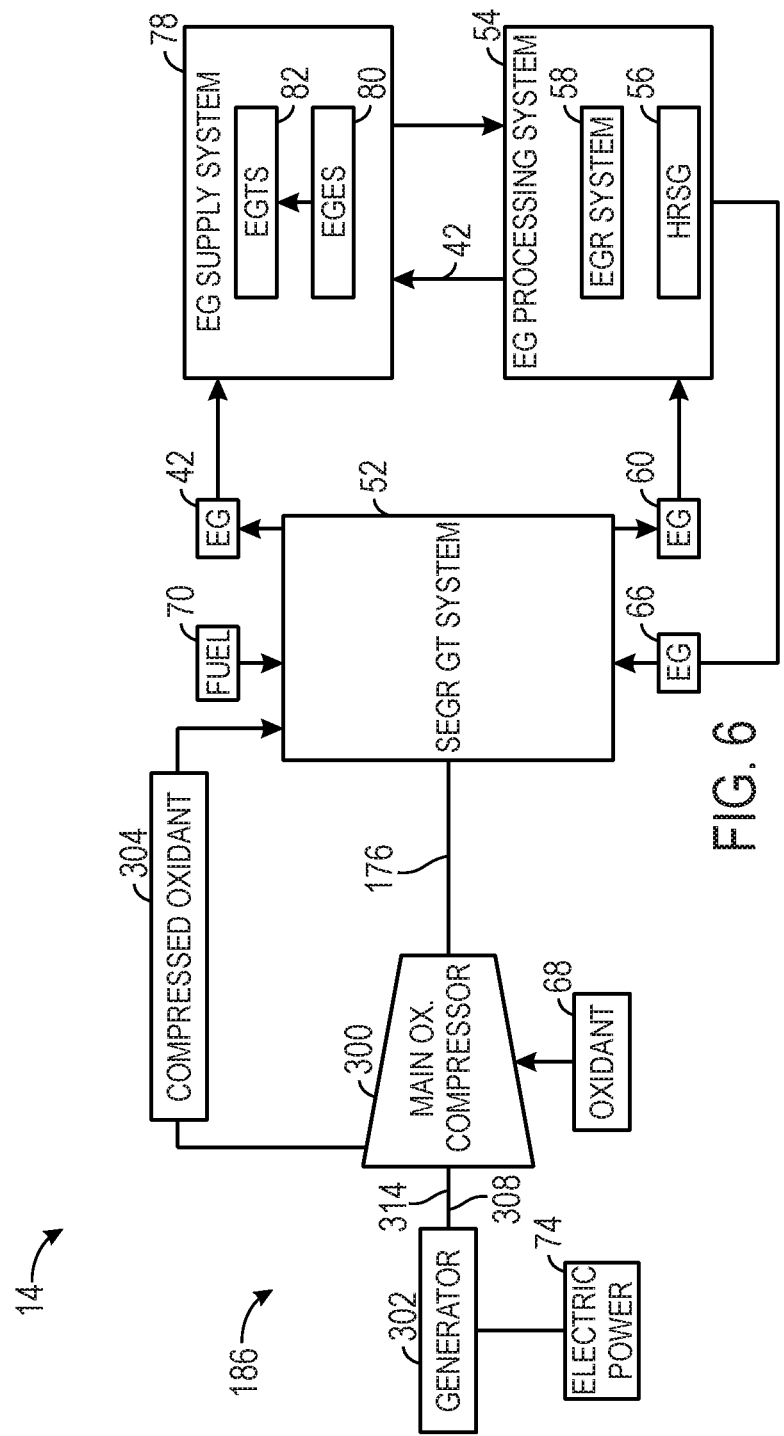
FIG. 6 is a diagram of an embodiment of the oxidant compression system of FIG. 3 having a main oxidant compressor directly driven by the SEGR GT system, and the main oxidant compressor drives an electrical generator.

Moving now to FIG. 6, another embodiment of the oxidant compression system 186 is illustrated. In FIG. 6, the MOC 300 is directly driven by the SEGR GT system 52. In particular, the MOC 300 in FIG. 6 is a double ended compressor in which the SEGR GT system 52 provides input power to the MOC 300, and the MOC 300 provides input power to the generator 302. In other words, in the configuration illustrated in FIG. 6, the respective positions of the MOC 300 and the generator 302 are reversed compared to the configuration in FIG. 5. Thus, an output shaft 314 of the MOC 300 is mechanically coupled to the input shaft 308 of the generator 302.

Such a configuration may be desirable in that the generator 302 does not drive the MOC 300, which enables a wider variety of generators (i.e., those not necessarily having oversized shafts) to be utilized. Indeed, the generator 302 may be a single- or a double-ended generator that is driven by the MOC 300 to produce the electric power 74. In embodiments where the generator 302 is a double-ended generator, the generator 302 may in turn drive one or more additional features of the oxidant compression system 186 and/or the turbine-based service system 14, such as various pumps, booster compressors, or the like.

Again, the MOC 300 may be an axial flow compressor, a centrifugal compressor, or a combination thereof. In other words, the MOC 300 may include only axial flow stages, only radial flow stages, or a combination of axial and radial stages. Further, it should be noted that in the configurations illustrated in FIGS. 5 and 6, because the shaft 176 directly drives the MOC 300 (or directly drives a feature that in turn directly drives the MOC 300), the MOC 300 may be configured such that its operational speed is substantially the same as that of the compressor section 152 and the turbine section 156 of the gas turbine engine 150. Such a configuration, while high in efficiency, may not offer operational flexibility. Furthermore, it may be difficult to realize an axial flow compressor that operates at typical gas turbine engine operating speeds. Indeed, only a fraction of a flow capacity of the MOC 300 may be utilized in the operation of the SEGR GT system 52 due at least in part to the use of exhaust gas as a diluent during combustion in addition to the compressed oxidant 304. Accordingly, it may be desirable to provide features that enable the MOC 300 to operate at a certain rotational speed when compared to the SEGR GT system. For example, it may be desirable to operate the MOC 300 at a first operating speed that is different than a first operating speed of the SEGR GT system 52 (e.g., a first speed of the shaft 176).

Figure 7:
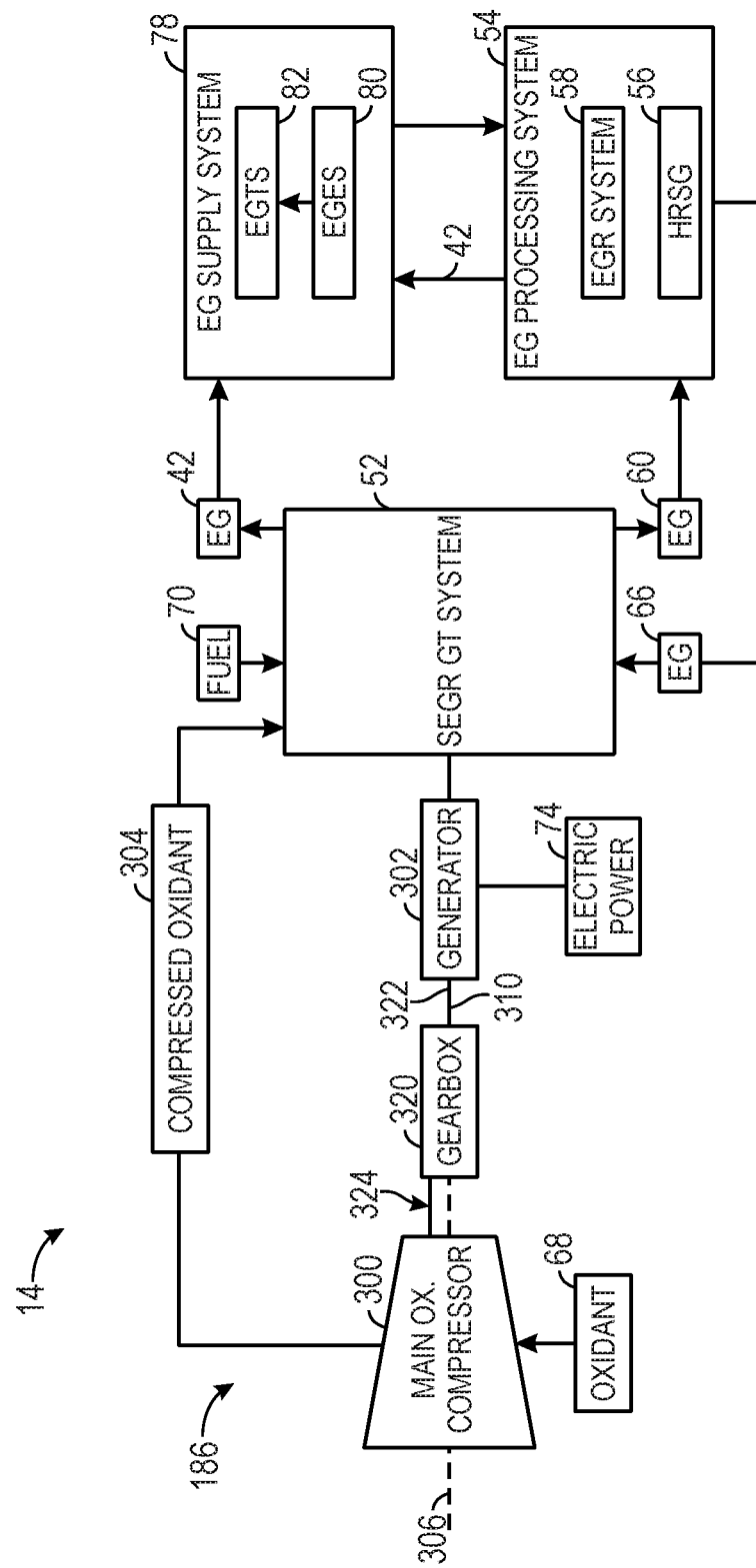
FIG. 7 is a diagram of an embodiment of the oxidant compression system of FIG. 3 having a main oxidant compressor indirectly driven by the SEGR GT system via an electrical generator and a gearbox.

One such embodiment of the oxidant compression system 186 is illustrated in FIG. 7. In particular, the oxidant compression system 186 includes a gearbox 320, which enables the MOC 300 to operate at a different speed when compared to the SEGR GT system 52. In particular, the generator 302 directly drives the gearbox 320, and the SEGR GT system 52 directly drives the generator 302. The gearbox 320 may be a speed-increasing or a speed-decreasing gearbox that drives the MOC 300 at its design speed. Therefore, the MOC 300 may be designed or selected so as to provide a desired amount (e.g., flow rate and pressure) of the compressed oxidant 304 to the SEGR GT system 52 while operating at a different speed compared to the compressor section 152 of the SEGR GT system 52. For example, in one embodiment, the MOC 300 may be an axial flow compressor that is similar in scale to the compressor of the compressor section 152 of the SEGR GT system 52, which may also be an axial flow compressor. However, in other embodiments, the MOC 300 may be smaller or larger than the compressor of the SEGR GT system 52.

As an example in which the MOC 300 and the SEGR GT system 52 operate at different speeds, in a configuration in which the flow rate of the MOC 300 is 40% of the design flow rate of the compressor of the compressor section 152, the operating speed of the MOC 300 may be approximately 1.6 times the operating speed of the SEGR GT system 52. Indeed, by way of example, the gearbox 320 may enable the MOC 300 to operate at a speed that is at least 1% higher, such as between 10% and 200%, between 20% and 150%, between 30% and 100%, or between 40% and 75% higher, than the speed of the SEGR GT system 52. Conversely, in embodiments where the gearbox 320 is a speed-decreasing gearbox, the gearbox 320, by way of example, may enable the MOC 300 to operate at a speed that is at least 1% lower, such as between 10% and 90%, between 20% and 80%, between 30% and 70%, or between 40% and 60% lower, than the speed of the SEGR GT system 52.

In accordance with present embodiments, the gearbox 320 may have any suitable configuration. For example, in one embodiment, the gearbox 320 may be a parallel shaft gearbox in which an input shaft 322 of the gearbox 320 is not in line with, but is generally parallel to an output shaft 324 of the gearbox 320. In another embodiment, the gearbox 320 may be an epicyclic gearbox or other speed increasing or decreasing gearbox in which the input shaft 322 of the gearbox 320 is in line with the output shaft 324 of the gearbox 320 and, in certain embodiments, is along the shaft line 306. Furthermore, other gearbox arrangements are presently contemplated. For example, gearbox arrangements in which idler gears increase shaft separation are contemplated, and/or embodiments of gearboxes having multiple output and/or input shafts to drive other equipment or to enable the use of an additional drive, such as an additional turbine engine, are also presently contemplated.

Figure 8:
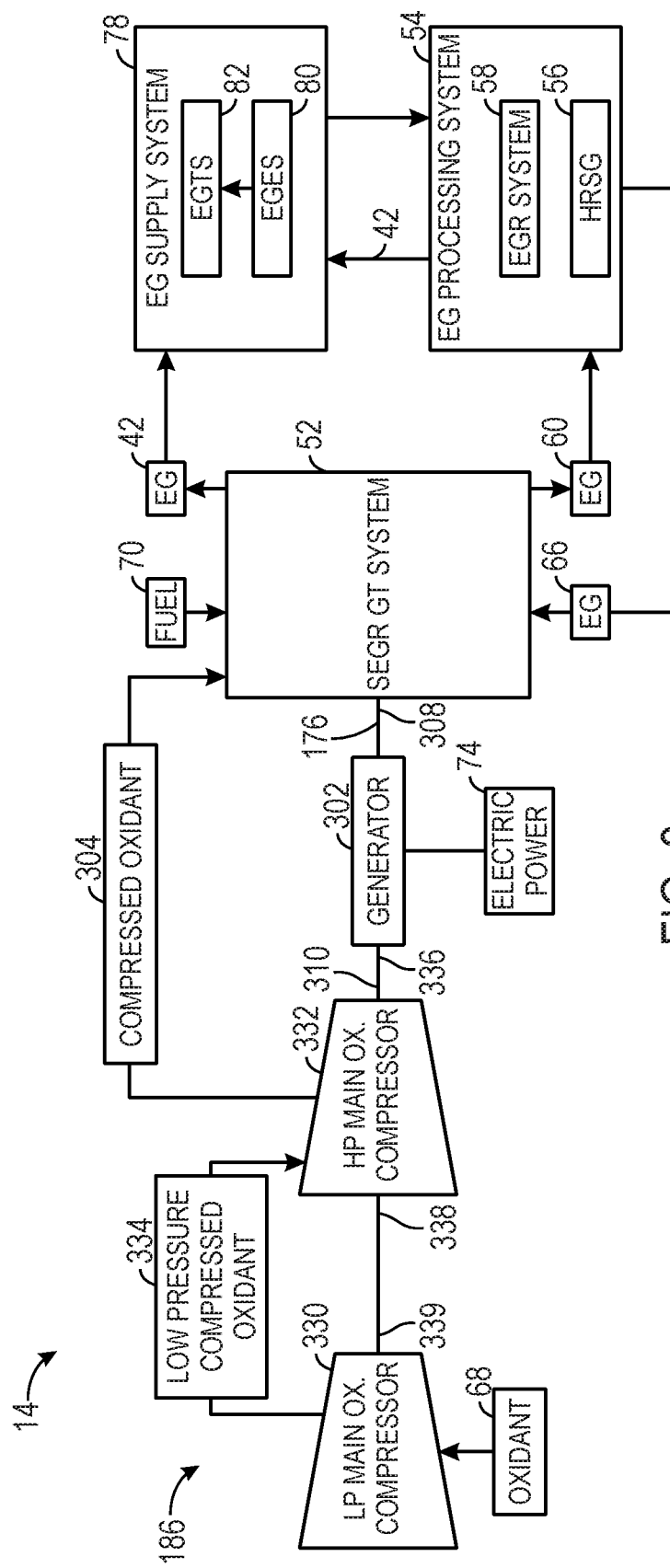
FIG. 8 is a diagram of an embodiment of the oxidant compression system of FIG. 3 having oxidant compression separated into low pressure and high pressure compressors driven by the SEGR GT system via an electrical generator.

As noted above, the MOC 300 may include one or more compression stages housed within a single or multiple compressor casings. FIG. 8 illustrates an embodiment of the oxidant compressor system 186 in which the compression stages are provided as multiple stages housed in separate casings. In particular, the illustrated oxidant compression system 186 includes a low pressure (LP) MOC 330 and a high pressure (HP) MOC 332. The LP MOC 330 receives the oxidant 68 (e.g., at an inlet of the LP MOC 330) and compresses the oxidant 68 to a first pressure—producing and subsequently discharging (e.g., from an outlet of the LP MOC 330) LP compressed oxidant 334. The HP MOC 332 receives (e.g., an at inlet of the HP MOC 332) and compresses the LP compressed oxidant 334 to produce the compressed oxidant 304 used by the SEGR GT system 52.

In the illustrated embodiment, the HP MOC 332 is driven by the generator 302, which is double-ended, to compress the low pressure compressed oxidant 334. The generator 302, in turn, is directly driven by the SEGR GT system 52. The HP MOC 332 is also double ended. Thus, an input 336 (e.g., an input shaft) to the HP MOC 332 is the output shaft 310 of the generator 302, and an output 338 of the HP MOC 332 (e.g., an output shaft) is an input 339 (e.g., an input shaft) of the LP MOC 330. That is, the HP MOC 332 is mechanically coupled to the output shaft 310 of the generator 302 for mechanical power and in turn provides power to the LP MOC 330, which is mechanically coupled to the output shaft 338 of the HP MOC 332.

The LP MOC 330 may produce the low pressure compressed oxidant 334 at a pressure that is between 10% and 90% of the pressure of the compressed oxidant 304. For example, the low pressure compressed oxidant 334 may be between 20% and 80%, 30% and 70%, or between 40% and 60% of the pressure of the compressed oxidant 304. Again, the HP MOC 332 then compresses the low pressure compressed oxidant 334 to the pressure, flow, and temperature desired for use in SEGR GT system 52 as the compressed oxidant 304.

It should be noted that the placement of the generator 302 is merely an example. Indeed, the generator 302 may be placed in a number of locations along the SEGR GT train. For example, the generator 302 may be placed generally along the shaft line 306 in between the LP MOC 330 and the HP MOC 332. In such an embodiment, the input shaft 308 of the generator 302 may be the output of the HP MOC 332, and the output shaft 310 of the generator 302 may be an input to the LP MOC 330. Alternatively, the generator 302 may be placed at the end of the train as discussed above. Thus, in accordance with present embodiments, the generator 302, the LP MOC 330, and the HP MOC 332 of FIG. 8 may all operate at substantially the same operating speed as the SEGR GT system 52.

As discussed above with respect to the MOC 300 of FIGS. 5-7, the LP MOC 330 and the HP MOC 332 may be axial flow compressors each having one or more compression stages housed within a single casing or multiple casings. Indeed, any number of stages may be employed in the LP MOC 330 and the HP MOC 332, with or without cooling features for interstage cooling. Furthermore, the LP MOC 330 and the HP MOC 332 may independently be axial flow compressors, centrifugal compressors, or a combination of compression features including axial compression stages and radial compression stages. Thus, the LP MOC 330 and the HP MOC 332 may be axi-radial or axial-radial compressors. Furthermore, in one embodiment, the LP MOC 330, the HP MOC 332, and the generator 302 may be disposed within a single casing.

Figure 9:
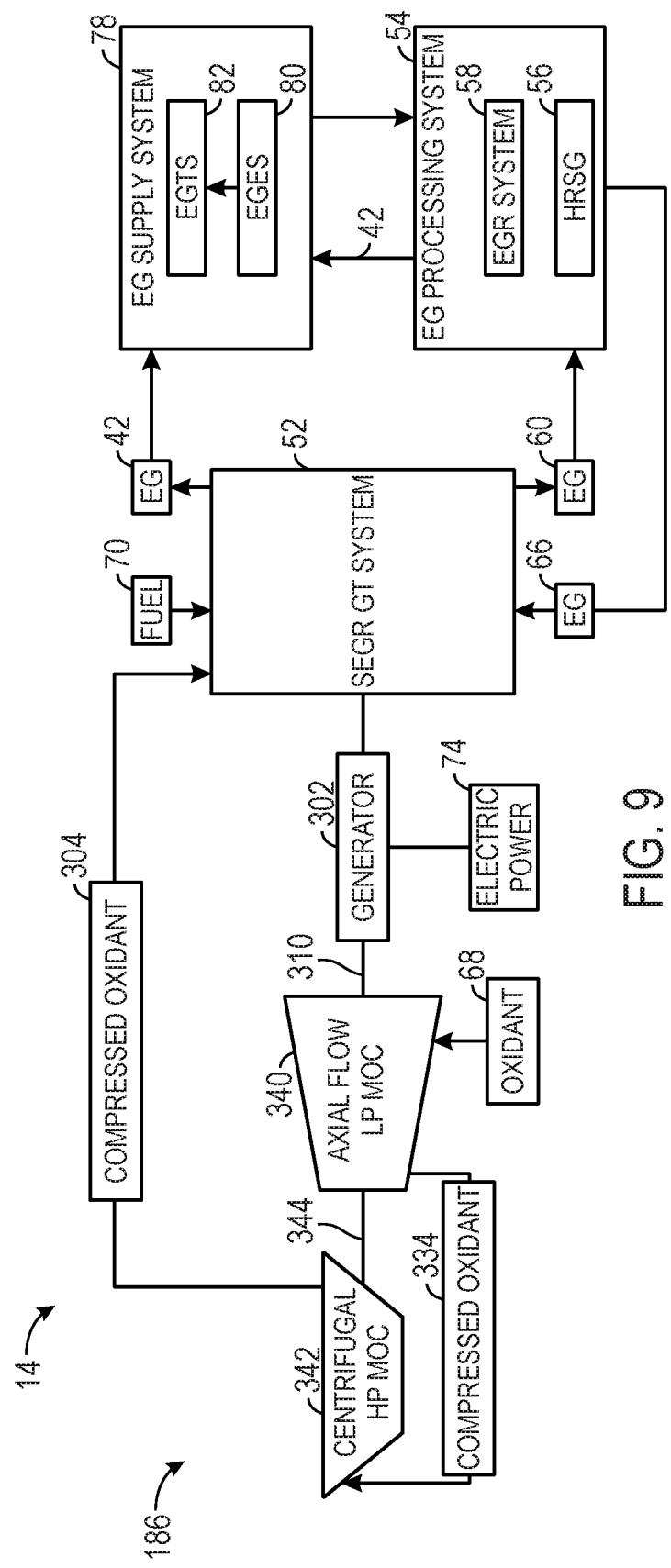
FIG. 9 is a diagram of an embodiment of the oxidant compression system of FIG. 3 having oxidant compression separated into low pressure and high pressure compressors driven by the SEGR GT system via an electrical generator, the low pressure compressor being an axial flow compressor and the high pressure compressor being a centrifugal compressor.

Moving now to FIG. 9, an embodiment of the oxidant compression system 186 is depicted in which main oxidant compression is divided into an axial flow LP MOC 340 and a centrifugal HP MOC 342. As illustrated, the axial flow LP MOC 340 is driven by the generator 302, which is in turn directly driven by the SEGR GT system 52. Similarly, the centrifugal HP MOC 342 is directly driven by the axial flow LP MOC 340, which is double ended. Thus, the axial flow LP MOC 340 is mechanically coupled to the output shaft 310 of the generator 302, and the centrifugal HP MOC 342 is mechanically coupled to an output 344 (e.g., an output shaft) of the axial flow LP MOC 340.

During operation, the axial flow LP MOC 340 receives the oxidant 68 and produces the low pressure compressed oxidant 334, which is provided to the centrifugal HP MOC 342 to provide staged compression (e.g., series compression). The centrifugal HP MOC 342 then produces the compressed oxidant 304 from the low pressure compressed oxidant 334. The axial flow LP MOC 340 and/or the centrifugal HP MOC 342 may be housed in one or more casings, and may include one or more compression stages. For example, the axial flow LP MOC 340 may include one or more oxidant compression stages, such that the oxidant 68 is compressed along a series of axial compression stages until the oxidant reaches a desired pressure that is suitable for provision to the centrifugal HP MOC 342. As noted above with respect to the LP MOC 330 of FIG. 8, the LP MOC 340 may produce the low pressure compressed oxidant 334 at a pressure that is between 10% and 90% of the pressure of the compressed oxidant 304. For example, the low pressure compressed oxidant 334 may be between 20% and 80%, 30% and 70%, or between 40% and 60% of the pressure of the compressed oxidant 304. Likewise, the centrifugal HP MOC 342 may progressively compress the low pressure compressed oxidant 334 in a series of radial compression stages until the oxidant is compressed to a suitable pressure for provision to the SEGR GT system 52.

In a similar manner as discussed above with respect to FIG. 8, the generator 302 of FIG. 9 may be placed in a variety of positions along the GT train. For example, the generator 302, rather than being positioned between the axial flow LP MOC 340 and the SEGR GT system 52, may instead be placed between the centrifugal HP MOC 342 and the axial flow LP MOC 340. Thus, an input to the generator 302 may be the output shaft 344 of the axial flow LP MOC 340, and the output shaft 310 of the generator 302 may be the input for the centrifugal HP MOC 342. Further, the generator 302 may be located at the end of the GT train. In such an embodiment, the centrifugal HP MOC 342 may be double ended such that an input of the centrifugal HP MOC 342 is the output of the axial flow LP MOC 340, and the output of the centrifugal HP MOC 342 is the input for the generator 302.

Figure 10:
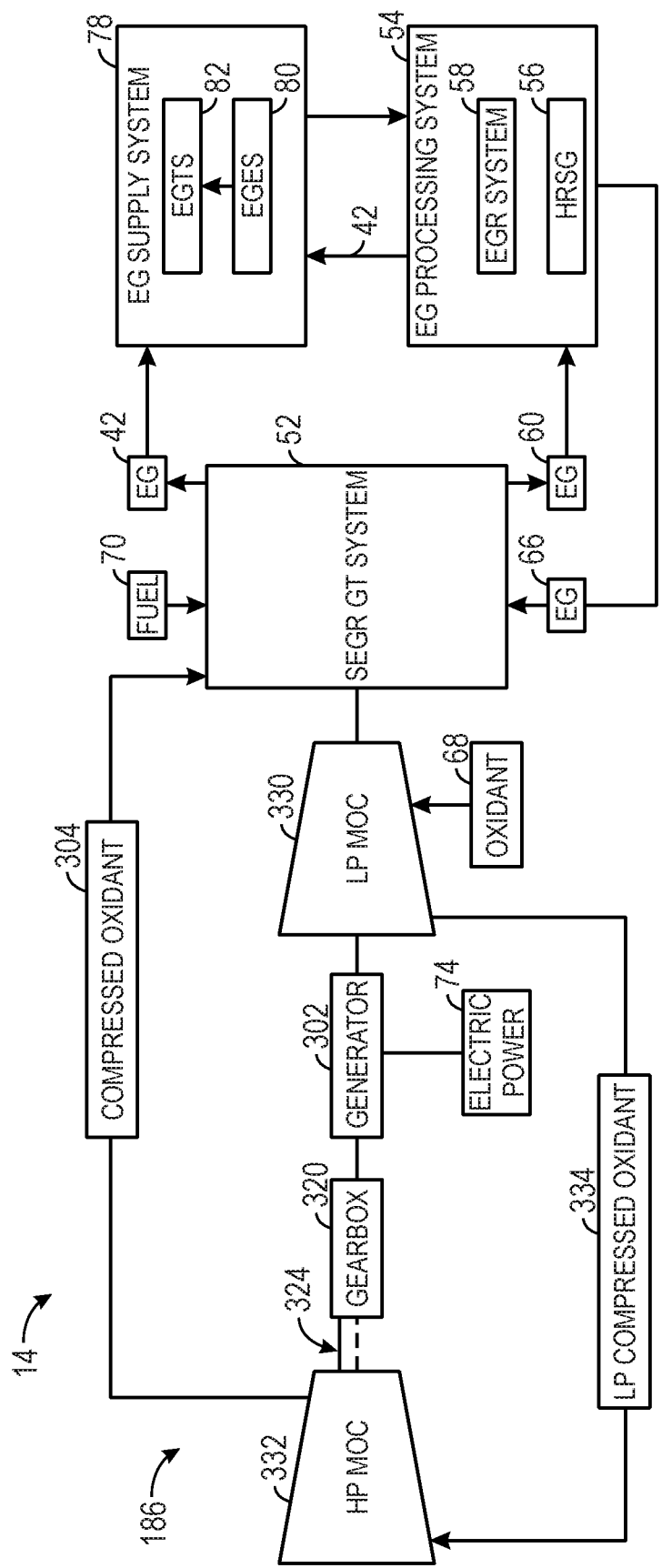
FIG. 10 is a diagram of an embodiment of the oxidant compression system of FIG. 3 having oxidant compression separated into low pressure and high pressure compressors driven by the SEGR GT system, the low pressure compressor being directly driven by the SEGR GT system and the high pressure compressor being driven via the low pressure compressor, a generator, and a gearbox.
Figure 11:
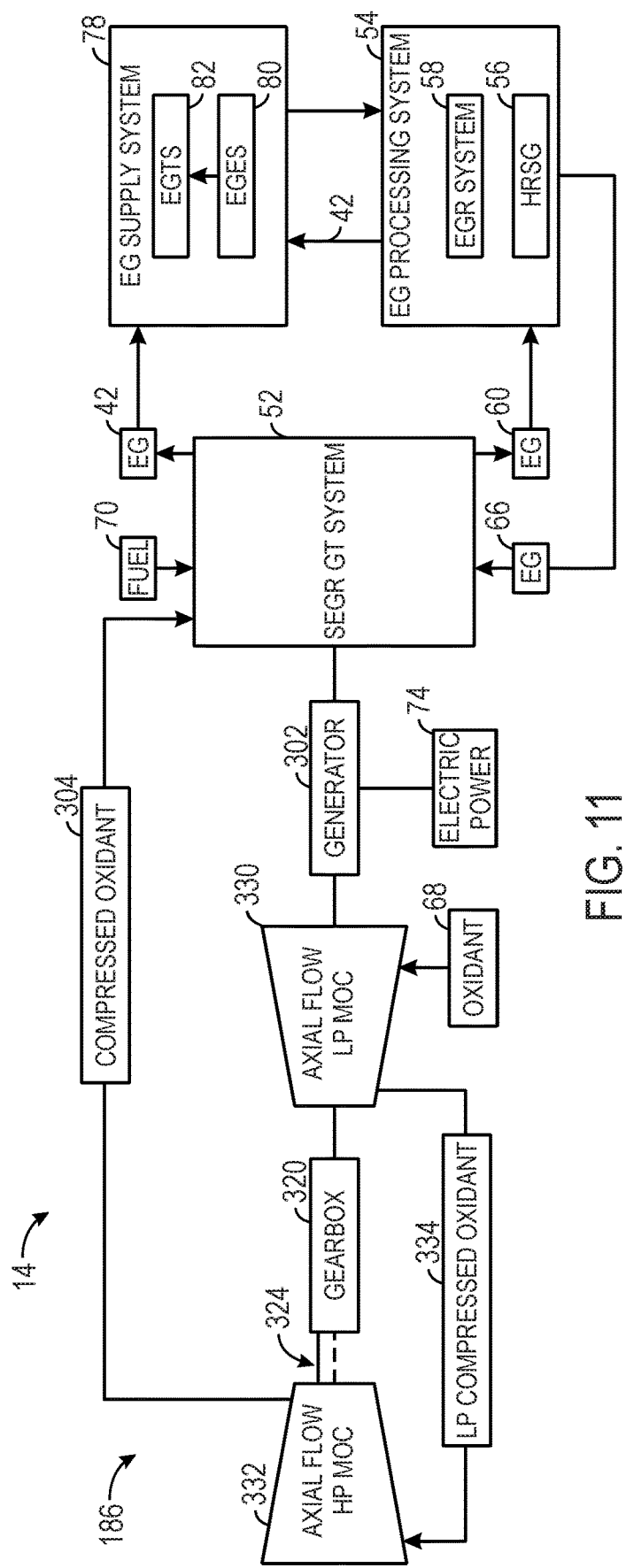
FIG. 11 is a diagram of an embodiment of the oxidant compression system of FIG. 3 having oxidant compression separated into low pressure and high pressure compressors driven by the SEGR GT system, the low pressure compressor being driven by the SEGR GT system via an electrical generator and the high pressure compressor being driven via the low pressure compressor and a gearbox.

As depicted in FIG. 10, the present disclosure also provides embodiments in which the speed-increasing or speed-decreasing gearbox 320 is disposed between the LP MOC 330 and the HP MOC 332 operating in series (e.g., staged compression). Thus, the HP MOC 332 and the LP MOC 330 may operate at the same or different operational speeds. For example, as illustrated, the LP MOC 330 may operate at substantially the same operational speed as the SEGR GT system 52. However, the HP MOC 332, driven by the LP MOC 330 via the gearbox 320, may operate at a faster or slower operational speed when compared to the LP MOC 330 and, concomitantly, the SEGR GT system 52. For example, the HP MOC 332 may operate at a speed that is between 10% and 200% of the operating speed of the SEGR GT system 52. More specifically, the HP MOC 332 may operate at speed that is between approximately 20% and 180%, 40% and 160%, 60% and 140%, 80% and 120% of the operating speed of the SEGR GT system 52.

In embodiments in which the HP MOC 332 operates at a lower operational speed compared to the SEGR GT system 52, the HP MOC 332 may operate at a speed that is between approximately 10% and 90%, 20% and 80%, 30% and 70%, or 40% and 60% of the operational speed at SEGR GT system 52. Conversely, in embodiments in which the HP MOC 332 operates at a higher operational speed when compared to the SEGR GT system 52, the HP MOC 332 may operate at a speed that is at least approximately 10% greater than the operational speed of the SEGR GT system 52. More specifically, the HP MOC 332 may operate at a speed that is between approximately 20% and 200% greater, 50% and 150% greater, or approximately 100% greater than the SEGR GT system 52.

In a similar manner to the embodiments discussed above with respect to FIGS. 5-10, it should be noted that the generator 302 may be placed at various positions along the SEGR train. For example, moving to FIG. 11, the generator 302 is illustrated as being positioned between the axial flow LP MOC 330 and the SEGR GT system 52. Thus, the generator 302 is directly driven by the SEGR GT system 52, and directly drives the axial flow LP MOC 330. In other words, compared to the configuration of FIG. 10, the respective positions of the generator 302 and the LP MOC 330 are reversed. Further, as illustrated, the axial flow HP MOC 332 is driven by the axial flow LP MOC 330 via the speed-increasing or speed-decreasing gearbox 320. Again, the gearbox 320 may be any speed increasing or speed decreasing gearbox, such as a parallel shaft gearbox or an epicyclic gearbox.

Figure 12:
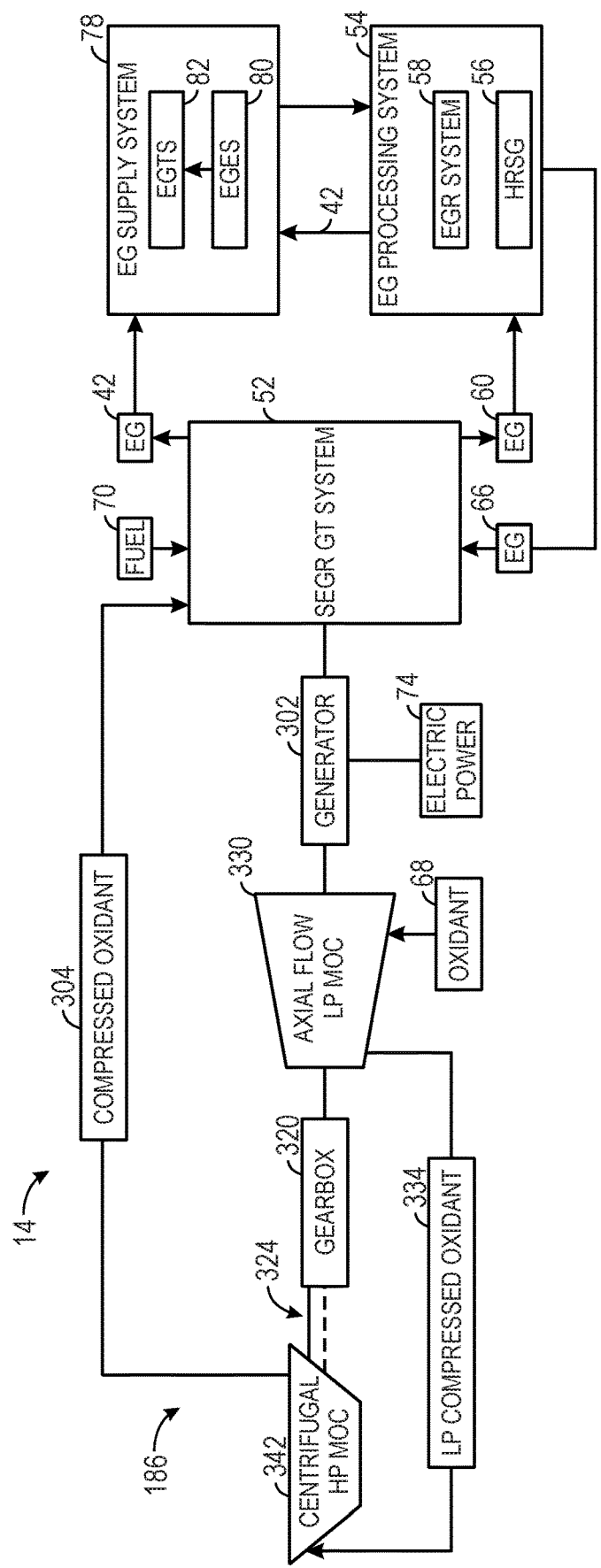
FIG. 12 is a diagram of an embodiment of the oxidant compression system of FIG. 3 similar to the embodiment of FIG. 11, the high pressure compressor being a centrifugal compressor.
Figure 13:
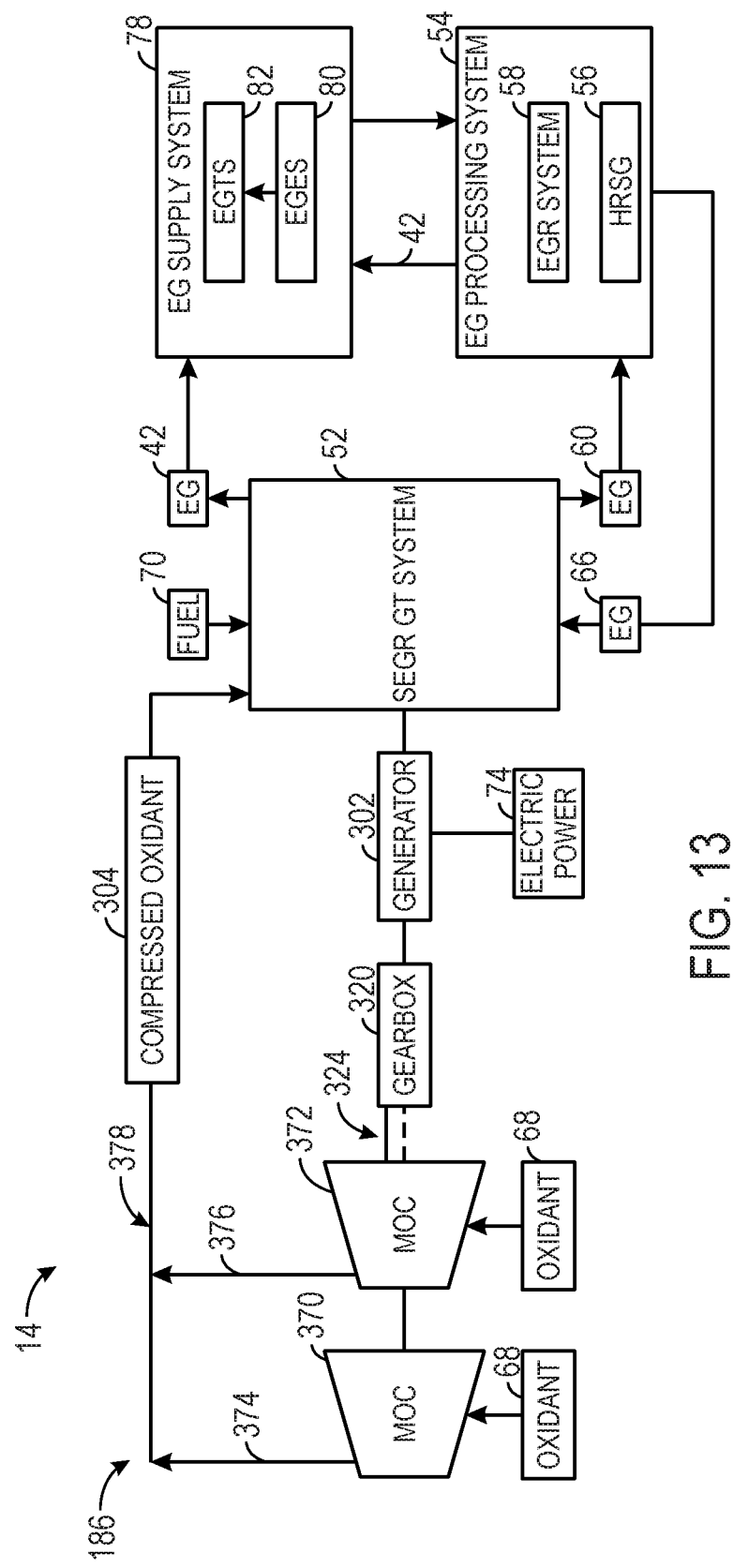
FIG. 13 is a diagram of an embodiment of the oxidant compression system of FIG. 3 having oxidant compression being performed by main oxidant compressors operating in parallel and driven in series by the SEGR GT system via an electrical generator and a gearbox.

As discussed above with respect to FIG. 10, the present disclosure also provides embodiments including combinations of centrifugal and axial flow compressors. Therefore, in one embodiment, the HP MOC 332 of FIGS. 10 and 11 may be replaced with the centrifugal HP MOC 342. Referring to FIG. 12, the centrifugal HP MOC 342 is driven via the gearbox 320 by the axial flow LP MOC 330. Further, as discussed above, the axial flow LP MOC 330 is directly driven by the SEGR GT system 52 via the generator 302. As discussed in detail above, in an alternative configuration, the axial flow LP MOC 330 and the generator 302 may reverse, such that the generator 302 is located along the train between the centrifugal HP MOC 342 and the axial flow LP MOC 330. Furthermore, it should be noted that the present disclosure also contemplates the use of two or more centrifugal oxidant compressors. Thus, in such embodiments, the axial flow LP MOC 330 may be replaced with one or more centrifugal LP MOCs.

While several of the foregoing embodiments are directed to configurations of the oxidant compression system 186 in which the main oxidant compressors are arranged in a series configuration, the present disclosure also provides embodiments in which oxidant compressors are operating in parallel (e.g., parallel compression). Moving now to FIG. 13, an embodiment of the oxidant compressor system 186 has first and second oxidant compressors 370, 372 configured to operate in parallel is provided. In the illustrated embodiment, the first and second MOCs 370, 372 each receive a separate influx of the oxidant 68. As should be appreciated, the first MOC 370 generates a first stream of compressed oxidant 374 and the second MOC 372 generates a second stream of compressed oxidant 376. The first and second compressed oxidant streams 374, 376 combine along a path 378 to flow the compressed oxidant 304 to the SEGR GT system 52.

As described above with respect to the MOC 300, the first and second MOCs may have any suitable configuration, including all-axial flow compression, axi-radial or axial-radial compression, or all-radial compression. Furthermore, the first and second MOCs may be substantially the same size, or may be different. That is, the first and second compressed oxidant streams may be at the same pressure and flow rate, or their respective pressures and/or flow rates may be different. By way of non-limiting example, the first and second MOCs may independently produce between 10% and 90% of the total compressed oxidant 304, with the remainder being produced by at least the remaining MOC. For example, the first MOC 370 may produce approximately 40% of the total compressed oxidant 304, while the second MOC 372 may produce the remainder—approximately 60%, or vice versa.

Such operational flexibility may be afforded by the use of the gearbox 320, though in certain embodiments the gearbox 320 may not be present. In certain embodiments, one or more additional gearboxes may also be utilized. For example, an additional gearbox may be positioned between the first and second MOCs 370, 372 to enable each MOC to operate at a speed independent from the other. Therefore, in some embodiments, the first and second MOCs 370, 372 may operate at the same or different speeds when compared to one another, and may independently operate at the same or different speeds when compared to the SEGR GT train 52. Furthermore, the first and second MOCs 370, 372 may be disposed within separate casings, as illustrated, or may be disposed within the same compressor casing, depending on the particular configuration utilized (e.g., whether additional features are positioned between them).

For example, in embodiments in which the first and second MOCs 370, 372 operate at a slower speed than the SEGR GT system 52, their operational speed may be between 10% and 90% of the operational speed of the SEGR GT system 52. Furthermore, in embodiments in which the first and second MOCs 370, 372 operate at a higher speed than the SEGR GT system 52, their speed may be at least 10%, at least 20%, at least 50%, at least 100%, or least 150% greater than the operational speed of the SEGR GT system 52.

The present disclosure also provides embodiments of the oxidant compression system 186 in which the gearbox 320 is not present. Thus, in such an embodiment, the first and second main oxidant compressors 370, 372 may operate at substantially the same speed as the SEGR GT system 52. Thus, the first and second MOCs 370, 372 may be directly driven by the SEGR GT system 52 via the generator 302. In other embodiments, the generator 302 may be placed along the GT train between the first and second MOCs 370, 372, such that the second MOC 372 is directly driven by the SEGR GT system 52. Therefore, the second MOC 372 may directly drive the first MOC 370 via the generator 302. Further, as discussed with respect to the embodiments above, the generator 302 may be positioned at the end of the SEGR GT train. In such an embodiment, the first MOC 370 may be double ended, such that the output of the first MOC 370 provides the input power for the generator 302.

Figure 14:
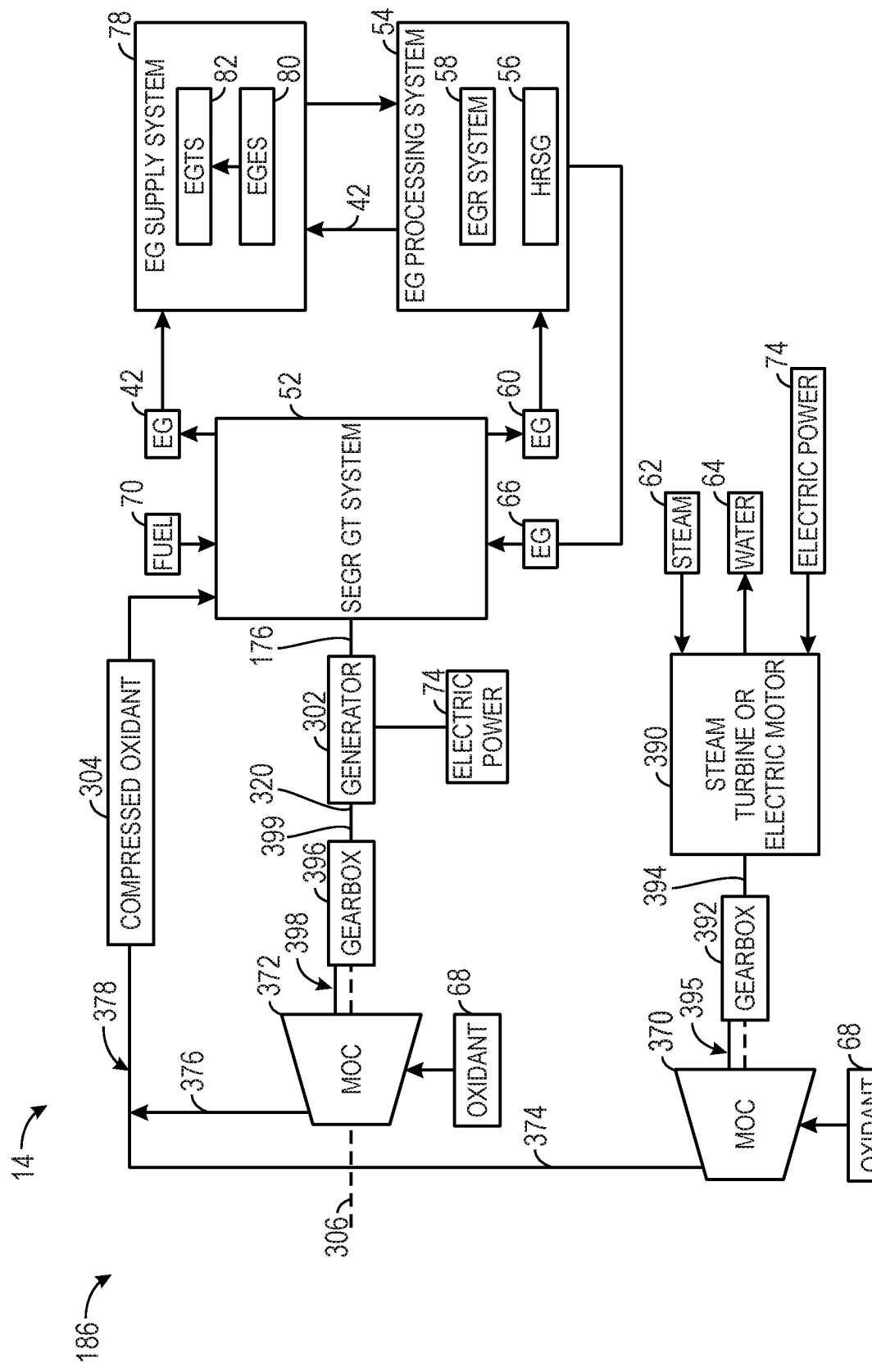
FIG. 14 is a diagram of an embodiment of the oxidant compression system of FIG. 3 having oxidant compression being performed by main oxidant compressors operating in parallel, with one compressor being driven by the SEGR GT system via an electrical generator and a gearbox, and the other oxidant compressor being driven by an additional drive and an additional gearbox.

While the embodiments discussed above generally include configurations in which the oxidant compressors derive a majority or all their power from the SEGR GT system 52, the present disclosure also provides embodiments in which one or more of the oxidant compressors are driven by an additional drive, such as a steam turbine or an electric motor. Such embodiments are discussed with respect to FIGS. 14-17. Referring now to FIG. 14, an embodiment of the oxidant compression system 186 is illustrated as having the first MOC 370 decoupled from the train of the SEGR GT system 52. In other words, the first MOC 370 is not positioned along the shaft line 306.

In particular, the first MOC 370 is driven by an additional drive 390, which may be a steam turbine, electric motor, or any other suitable prime mover. As illustrated, the first MOC 370 is driven by the additional drive 390 via a first gearbox 392, which may be any speed-increasing or speed-decreasing gearbox. Indeed, the first gearbox 392 may be a parallel shaft or epicyclic gearbox. Accordingly, the first MOC 370 generally derives its power from a shaft 394 of the additional drive 390. In particular, the shaft 394 of the additional drive 390 provides input power to the first gearbox 392. The first gearbox 392, in turn, provides input power to the first MOC 370 via an output shaft 395, which may be in-line with the shaft 394 of the additional drive 390 or may be substantially parallel to the shaft 394.

Again, the first MOC 370 and the second MOC 372 operate in parallel (e.g., parallel compression) to provide the first and second streams 374, 376, which combine to produce the compressed oxidant 304 that is directed to the SEGR GT system 52. While the first MOC 370 is decoupled from the SEGR GT train, the second MOC 372 is illustrated as deriving its energy from the SEGR GT system 52. In particular, the second MOC 372 is depicted as being driven by the SEGR GT system 52 via the generator 302 and a second gearbox 396. The second gearbox 396 receives input power from the output shaft 310 of the generator 302, and in turn provides output power to the second MOC 372 via its shaft 398. Again, the second gearbox 396 may be a parallel shaft or epicyclic gearbox, such that its output shaft 398 is substantially parallel with its input shaft 399 (e.g., the output shaft 310 of the generator 302), or in-line with its input shaft 399. Thus, the second MOC 372 may be driven at a different speed compared to the SEGR GT system 52 during operation while still producing a desired amount of the compressed oxidant 304.

In some embodiments, the first and second MOCS 370, 372 may operate at substantially the same speed, or at different speeds. Indeed, the first and second MOCs 370, 372 may independently operate at a higher or lower speed than the SEGR GT system 52. By way of non-limiting example, in embodiments where the first and second MOCs 370, 372 independently operate at a higher speed than the SEGR GT system, they may independently operate at least approximately 10% faster, such as between 10% and 200%, 50% and 150%, or approximately 100% faster. Conversely, in embodiments where the first and second MOCs 370, 372 independently operate at a slower speed than the SEGR GT system, they may independently operate at least approximately 10% slower, such as between 10% and 90%, 20% and 80%, 30% and 70%, or 40% and 60% slower.

Furthermore, it should be noted that the de-coupling of the first MOC 370 from the SEGR GT train may enable the additional drive 390 to power the first MOC 370 as the SEGR GT system 52 is coming on line. For example, during a startup procedure, the SEGR GT system 52 may not necessarily produce sufficient power to run the second MOC 372. However, because the first MOC 370 is driven by the additional drive 390, the first MOC 370 is able to produce a sufficient amount of the compressed oxidant 304 to enable combustion (e.g., stoichiometric combustion) during a startup procedure.

In still further embodiments, the first and second gearboxes 392, 396 may not be present. Thus, in such embodiments, the first MOC 370 may be directly driven by the additional drive 390, and the second MOC 372 may be directly driven through the generator 302 by the SEGR GT system 52. However, it should be noted that the first gearbox 392 and the second gearbox 396 may have a smaller size when compared to a typical gearbox. This is in part because each gearbox 392, 396 simply drives one MOC rather than two. Furthermore, the starting load on the SEGR GT system 52 may be reduced, since the additional drive 390 may generate the starting load for the first MOC 370, rather than for both of the first and second MOCs 370, 372.

As noted above, in some embodiments, the additional drive 390 may be a steam turbine. The steam turbine generally derives it power from any source of steam produced within the system, such as the steam 62 generated by the HRSG 56 of the EG processing system 54. For example, the HRSG 56 may generate the steam 62 at a first pressure (e.g., a high or medium pressure steam), and work may be extracted from the steam 62 by the steam turbine to generate a steam having a second pressure, which is lower than the first (e.g., a medium or low pressure steam). In certain embodiments, the steam turbine may extract sufficient work from the steam 62 so as to generate water 64. In this way, the efficiency of the compression system 186 may be enhanced in that the steam turbine (i.e., the additional drive 390) and the HRSG 56 may each produce a feed stream for the other.

Similarly, in embodiments in which additional drive 390 is an electric motor, the electric motor may derive its power from any electric power source. However, to enhance the efficiency of the oxidant compression system 186, the electric power used by the electric motor may be the electric power 74 generated by the generator 302, which is disposed along the SEGR GT train.

Furthermore, it should be noted that the first MOC 370 and the second MOC 372, while illustrated as axial flow compressors, may be any suitable compressor. For example, the first MOC 370, the second MOC 372, or a combination thereof, may be axial flow compressors, centrifugal compressors, or compressors having any number of suitable stages having axial and/or radial flow components.

Figure 15:
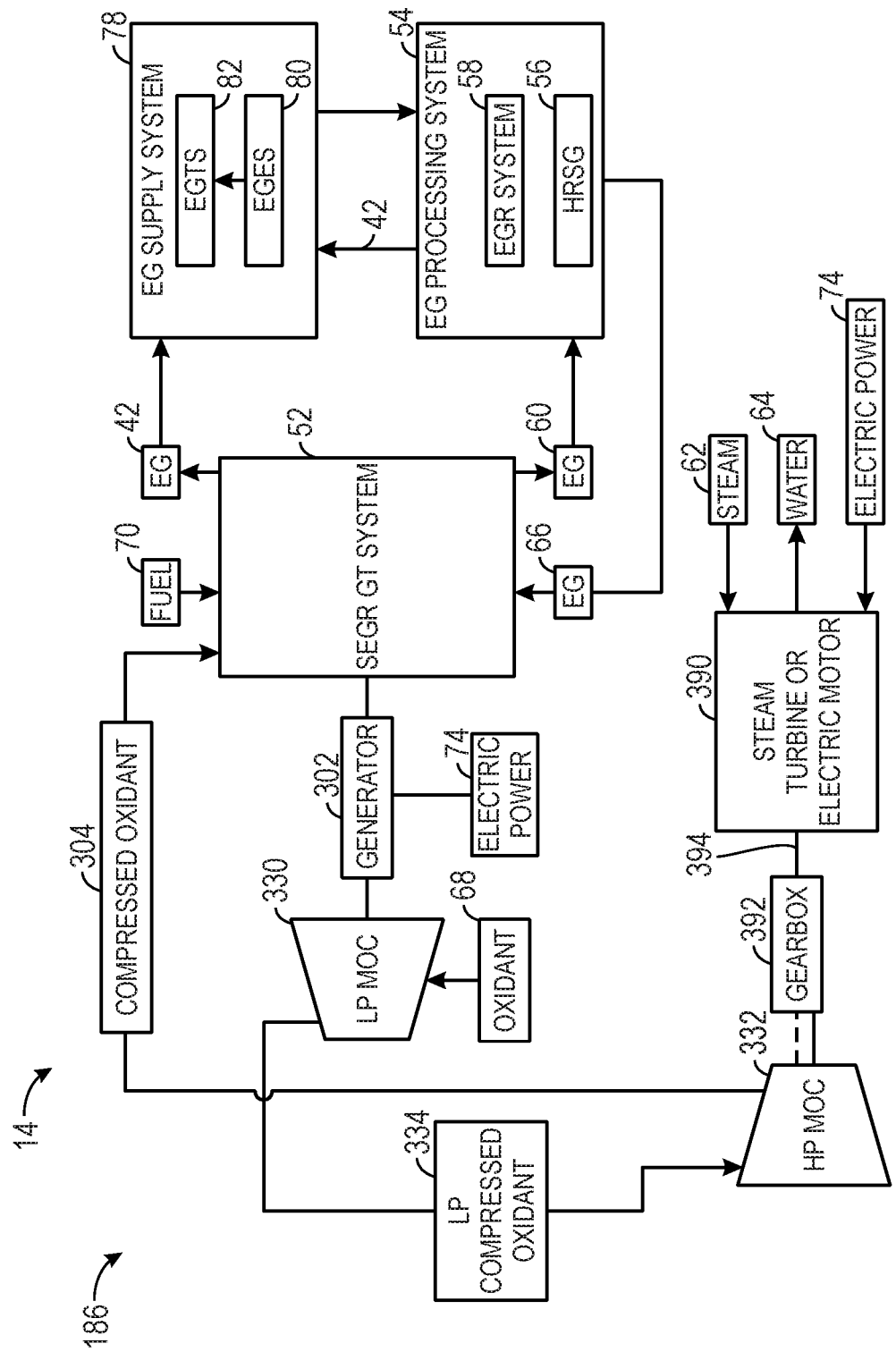
FIG. 15 is a diagram of an embodiment of the oxidant compression system of FIG. 3 having oxidant compression being performed by a low and a high pressure compressor operating in a series configuration of compression, and the low pressure compressor is driven by the SEGR GT system via an electrical generator, and the low pressure compressor is driven by an additional drive via a gearbox.

While the embodiments discussed above respect to FIG. 14 are provided in the context of two or more oxidant compressors operating in parallel, it should also be noted that embodiments in which at least one oxidant compressor that is operatively decoupled from the SEGR GT train may be fluidly coupled in series to another oxidant compressor that is coupled to the SEGR GT train. In other words, embodiments in which at least one oxidant compressor operating in a series configuration and is driven by the additional drive 390 is presently contemplated. For example, as illustrated in FIG. 15, which depicts an embodiment of the oxidant compressor system 186, the HP MOC 332 is driven by the additional drive 390 via the first gearbox 392. As also illustrated, the LP MOC 330 is directly driven by the SEGR GT system 52 through the generator 302. In other words, a first compression stage or first set of compression stages are driven by the SEGR GT system 52, while a second compression stage or set of compression stages In a similar manner as discussed above with respect to FIG. 14, the first gearbox 392 of FIG. 15 may be present in some embodiments and not present in others. Thus, the HP MOC 332 may be directly driven by the additional drive 390, or may be indirectly driven through the first gearbox 392. Further, the first gearbox 392 enables the HP MOC 332 to operate at a higher or a lower speed when compared to the additional drive 390.

In embodiments where the additional drive 390 is a steam turbine, the steam may be steam 62 produced by the HRSG 56, improving overall cycle efficiency. Alternatively, in embodiments in which the additional drive 390 is an electric motor, the electric motor may receive its power from the generator 302, which produces the electric power 74. Accordingly, in embodiments when such coupling is present, the HP MOC 332 may be considered to be drivingly de-coupled from the SEGR GT system 52.

As with the embodiments discussed above, the relative positions of the LP MOC 330 and the double ended generator 302 may be reversed. Therefore, the LP MOC 330 may be directly driven by the SEGR GT system 52, and its output may be the input of the generator 302. In such an embodiment, it should be appreciated that the generator 302 may not be double-ended and my instead merely receive an input. However, it is also presently contemplated that in embodiments where the generator 302 receives its input power from the LP MOC 330, the generator 302 may drive another piece of equipment such as, for example, a pump, compressor booster, or similar machine feature.

Figure 16:
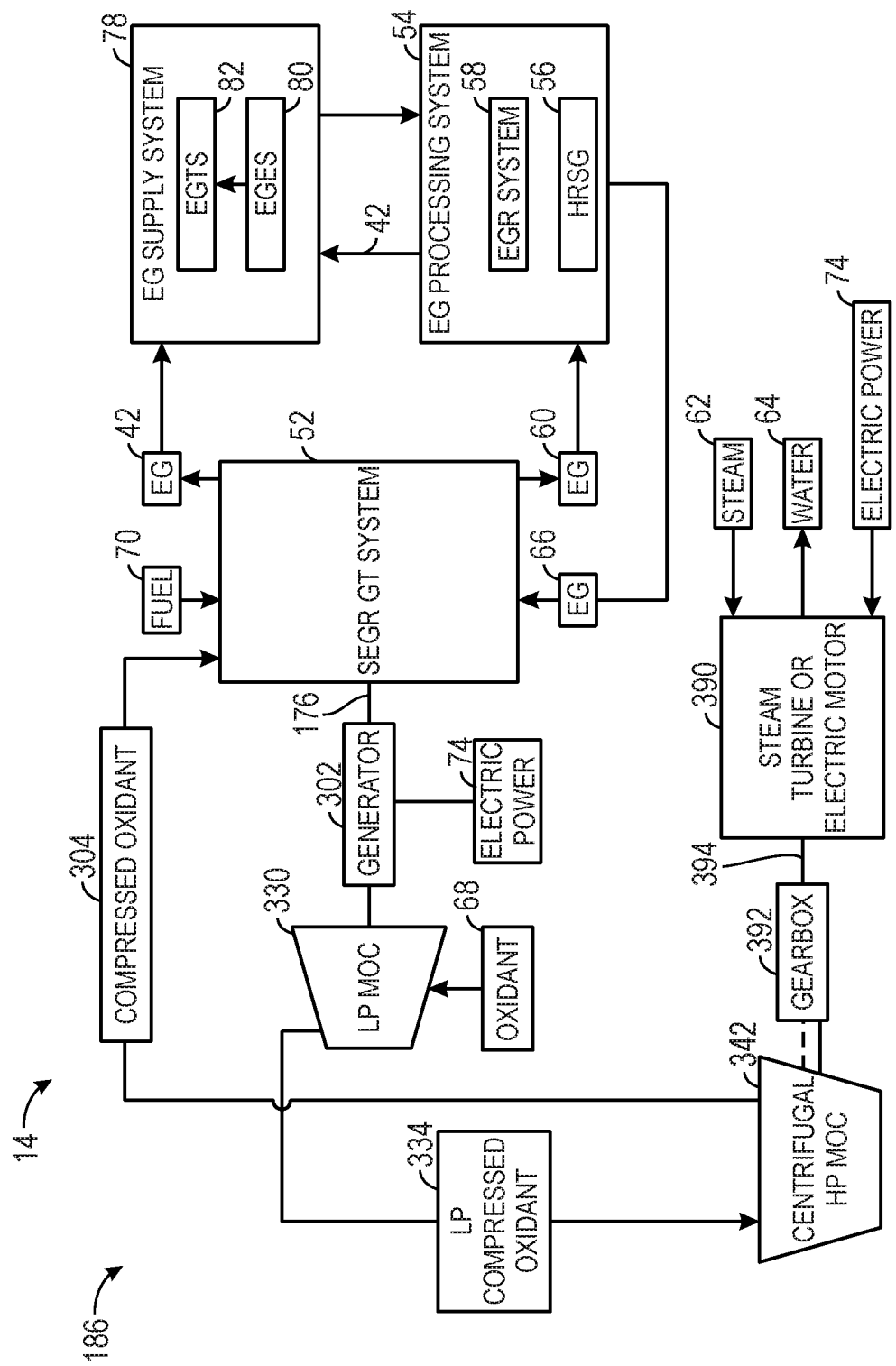
FIG. 16 is a diagram of an embodiment of the oxidant compression system of FIG. 3 similar to the embodiment of FIG. 15, with the high pressure compressor being a centrifugal compressor.

FIG. 16 depicts another embodiment of the oxidant compressor system 186 in which the axial flow HP MOC 332 is replaced with the centrifugal HP MOC 342. Thus, the centrifugal HP MOC 342 receives the LP compressed oxidant 334 from the LP MOC 330, and compresses the LP compressed oxidant 334 to produce the compressed oxidant 304 (e.g., via staged or series compression). It should be noted that any compression configuration may be utilized with either one of oxidant compressors of the oxidant compression system 186. Therefore, while the embodiment illustrated in FIG. 16 utilizes one axial flow compressor and one centrifugal compressor, any number of axial flow and/or centrifugal compressors housed in one or more compressor casings may be utilized. Indeed, the centrifugal HP MOC 342 may include one or more compression stages in which some, none or all of the stages are radial or axial. Likewise, the LP MOC 330, while illustrated as an axial flow compressor, may include one or more compression stages housed in one or more compressor casings in which some, none or all of the compression stages are axial and/or radial.

As with the previous configurations, it should be noted that the first gearbox 392 disposed between the centrifugal HP MOC 342 and the additional drive 390 may or may not be present. The first gearbox 392, as will be appreciated based on the foregoing discussions, enables the centrifugal HP MOC 342 to operate at a different operational speed than the additional drive 390. As also discussed above, the positions of the LP MOC 330 and the generator 302 may be reversed, such that the LP MOC 330 is directly driven by SEGR GT system 52, and in turn drives the generator 302. Furthermore, an additional gearbox (e.g., the second gearbox 396) may be positioned along the SEGR GT train between the LP MOC 330 and the SEGR GT shaft 176, so as to enable the LP MOC 300 to operate at a different speed compared to the SEGR GT system 52.

Figure 17:
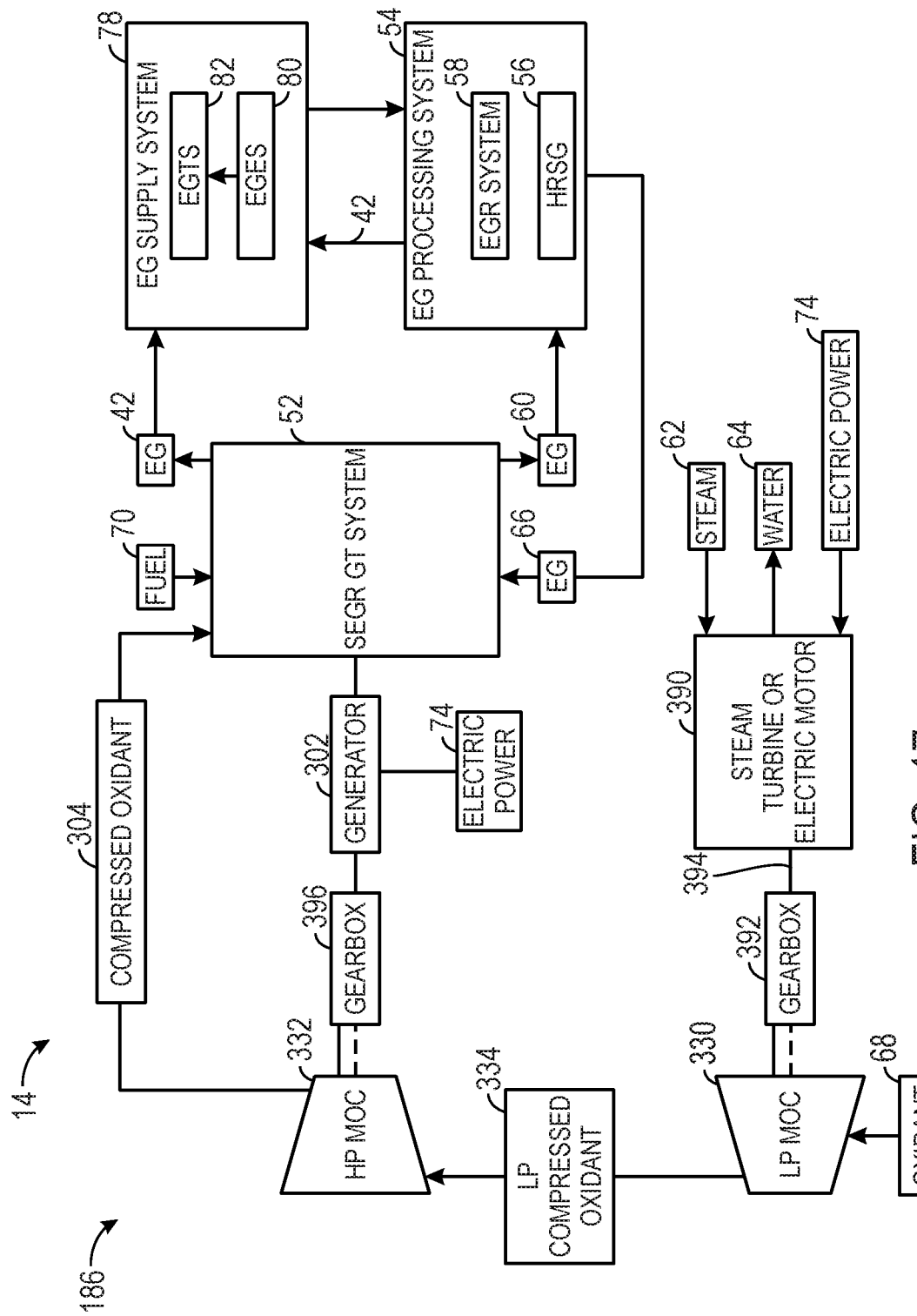
FIG. 17 is a diagram of an embodiment of the oxidant compression system of FIG. 3 having oxidant compression being performed by a low and a high pressure compressor operating in a series configuration of compression, and the high pressure compressor is driven by the SEGR GT system via an electrical generator and a gearbox, and the low pressure compressor is driven by an additional drive via an additional gearbox.

Embodiments in which the positions of the LP MOC 330 and the HP MOC 332 are reversed are also presently contemplated. FIG. 17 illustrates one such embodiment of the oxidant compression 186 in which the HP MOC 332 is generally disposed along the SEGR GT train, and the LP MOC 330 is de-coupled therefrom. In particular, the HP MOC 332 is driven by the SEGR GT system 52 via the generator 302 and through the second gearbox 396. Again, the second gearbox 396 enables the HP MOC 332 to be operated at the different speed when compared to the SEGR GT system 52.

As illustrated, the HP MOC 332 generates the compressed oxidant 304 from an inlet stream of the LP compressed oxidant 334 generated by the LP MOC 330. The LP MOC 330 is generally disposed along a train of the additional drive 390 which, as described above, may be a steam turbine, an electric motor, or similar drive. Specifically, the LP MOC 330 derives its power from the shaft 394 of the additional drive 390 through the first gearbox 392. The first gearbox 392 enables to LP MOC 330 to operate at the same or a different operational speed than the additional drive 390.

It should be noted that embodiments in which either or both of the gearboxes 392, 396 are not present are also contemplated. Thus, the HP MOC 332 may be directly driven by SEGR GT system 52 via the generator 302, and the LP MOC 330 may be directly driven by the additional drive 390. Furthermore, embodiments in which the position of the HP MOC 332 and generator 302 are switched are also presently contemplated. In such embodiments, the generator 302 may be single or double ended. In such embodiments in which generator 302 is double ended, an additional feature of the oxidant compression system 186 may be driven by generator 302.

In the embodiments discussed above in which multiple compressors are operating in series, such as embodiments in which oxidant discharged from an LP MOC is delivered through an inlet of the HP MOC, one or more cooling units may also be provided therebetween. In other words, in embodiments where series arrangements of an LP MOC and an HP MOC are provided, such an embodiment may also include one or more cooling units disposed between the HP MOC and the LP MOC along a flow path of the LP compressed oxidant 334.

Figure 18:
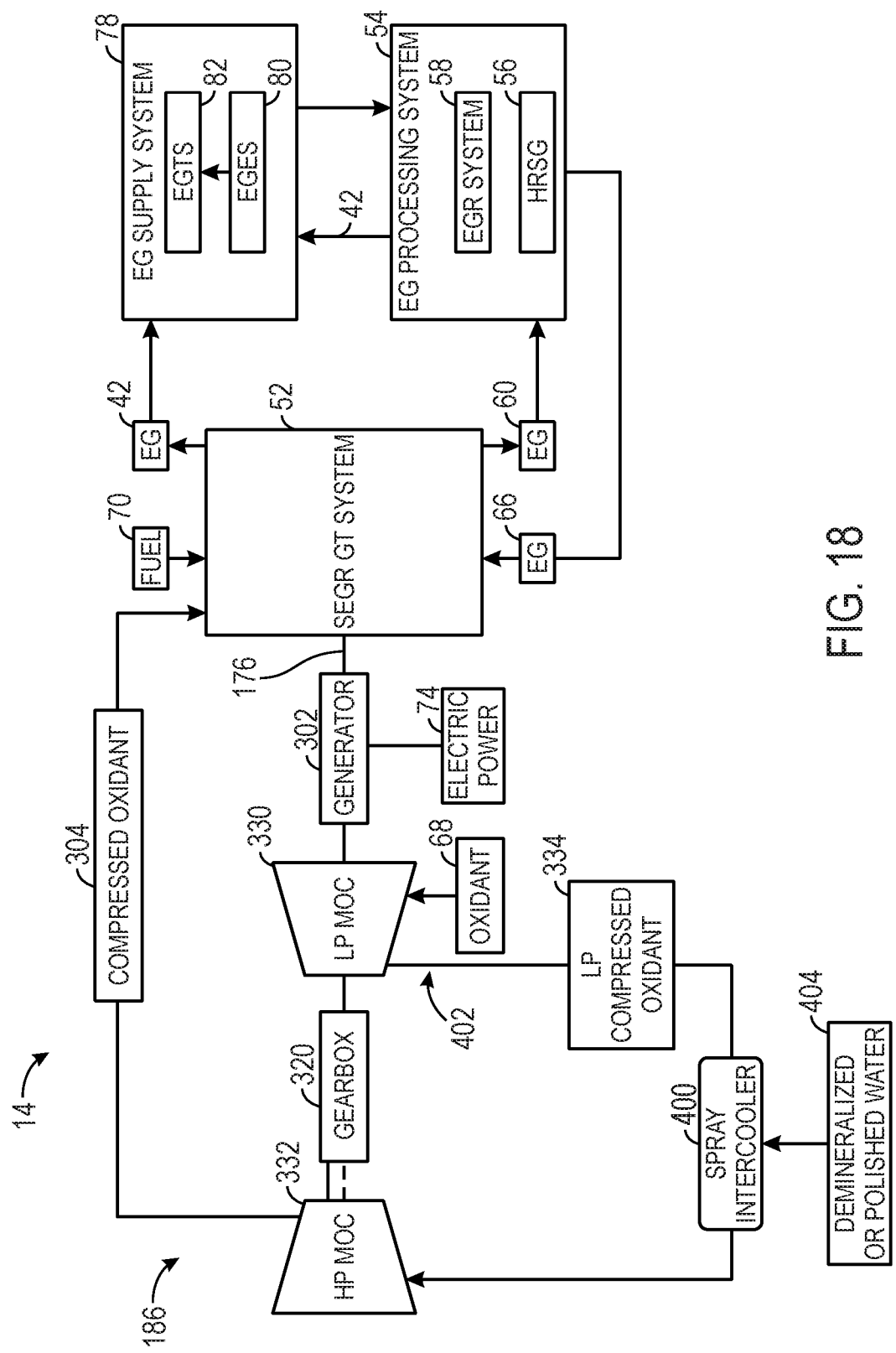
FIG. 18 is a diagram of an embodiment of the oxidant compression system of FIG. 3 having oxidant compression separated into low pressure and high pressure compressors driven by the SEGR GT system, the low pressure compressor being driven by the SEGR GT system via an electrical generator and the high pressure compressor being driven via the low pressure compressor and a gearbox, and a spray intercooler is positioned along a low pressure compressed oxidant flow path between the low and high pressure compressors.

One embodiment of the oxidant compression system 186 having such a cooling unit is depicted in FIG. 18. In particular, in the embodiment depicted in FIG. 18, the oxidant compression system 186 includes the LP MOC 330 and the HP MOC 332 operating in a series arrangement (e.g., staged or series compression), wherein both of the MOCs 330, 332 are disposed along the train of the SEGR GT system 52 (i.e., derive all or a majority of their power from the SEGR GT system 52. The LP MOC 330 is directly driven by the SEGR GT system 52 through the generator 302. The HP MOC 332, on the other hand, is driven by the LP MOC 330 through the gearbox 320 such that the HP MOC 332 is able to operate at a different speed when compared to LP MOC 330 or the SEGR GT system 52.

In addition to these features, the oxidant compression system 186 also includes a spray intercooler 400 disposed along a flow path 402 of the LP compressed oxidant 334 extending from an outlet of the LP MOC 300 to an inlet of the HP MOC 332. Though any suitable cooling fluid may be utilized, in the illustrated embodiment, the spray intercooler 400 utilizes demineralized or polished water 404 to cool the LP compressed oxidant 334. The demineralized or polished water 404 is generally substantially free of minerals, particulates, or other materials that may negatively affect various operating components (e.g., conduits, pumps, compressor blading and/or housing). By way of non-limiting example, water may be passed through a biological, chemical, or physical filter, or any combination thereof, to generate the polished or demineralized water.

In particular, the spray intercooler 400 utilizes psychrometric cooling to cool the LP compressed oxidant 334 by injecting a spray of the demineralized or polished water 404 into the stream 334. The demineralized or polished water 404 vaporizes, which reduces the temperature of the LP compressor oxidant stream 334 by reducing its superheat or dew point margin. While any fluid capable of engaging in this type of cooling may be utilized, it may be desirable for the water to be demineralized or polished so as to avoid the fouling or other deposit buildup within the piping of the flow path 402. Such a cooling method may be desirable in that pressure drop across conduits from the LP MOC 330 to the HP MOC 332 may be reduced or mitigated. In addition, such a cooling method may also obviate the need for costly heat exchange equipment.

As discussed in detail above, a single casing may house one or more of the compression stages. For example, in the embodiment depicted in FIG. 18, the LP MOC 330 and the HP MOC 332 may be housed in a single compressor casing. In such embodiments, the present disclosure also contemplates the use of one or more cooling features disposed therebetween. Thus, in some embodiments, the spray intercooler 400 maybe disposed on, within, or separate from a single casing housing the LP MOC 330 and HP MOC 332. For example, the intercooler 400 may be partially or totally positioned within a casing housing the LP and HP MOCs 330, 332, and may be configured to cool compressed oxidant in between compression stages.

Figure 19:
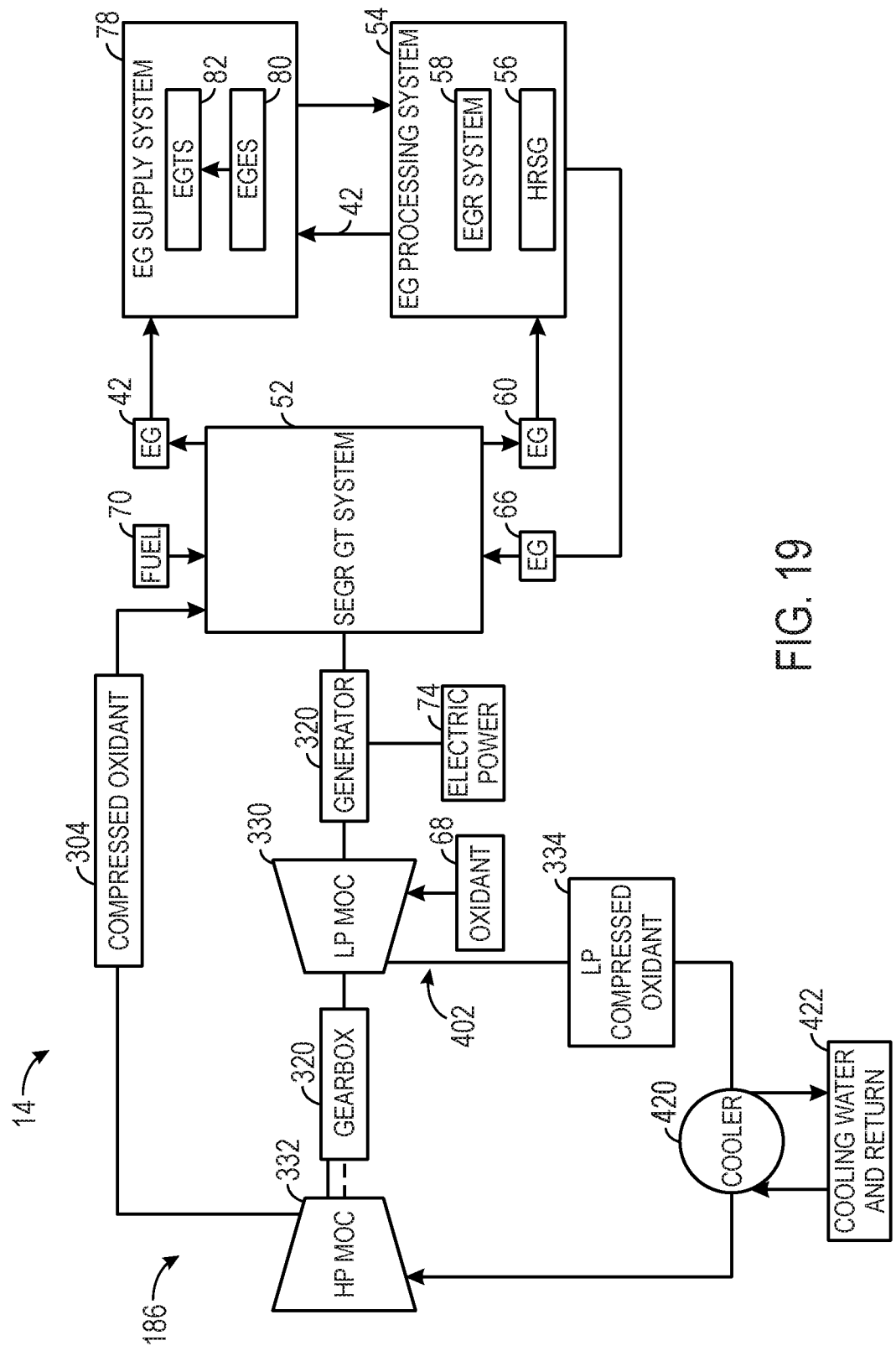
FIG. 19 is a diagram of an embodiment of the oxidant compression system of FIG. 3 having oxidant compression separated into low pressure and high pressure compressors driven by the SEGR GT system, the low pressure compressor being driven by the SEGR GT system via an electrical generator and the high pressure compressor being driven via the low pressure compressor and a gearbox, and a cooler is positioned along a low pressure compressed oxidant flow path between the low and high pressure compressors.

Turning now to FIG. 19, an embodiment of the oxidant compression system 186 in which a cooler 420 provides cooling along the flow path 402 of the LP compressed oxidant 334 is provided. In particular, the cooler 420 may be an intercooler (e.g., heat exchanger) that provides interstage cooling between LP MOC 330 and HP MOC 332. As discussed in detail above, the cooler 420 may be disposed on, in, or apart from one or more casings housing the LP MOC 330 and the HP MOC 332.

The cooler 420, which may be an intercooler, utilizes cooling water 422 or another cooling medium such as ambient air to cool the LP compressed oxidant 334 through heat exchange. Thus, the cooler 420 may be a heat exchanger that rejects heat to the cooling water 422 or to the ambient environment. To enable such cooling, the cooler 420 may be any suitable type of heat exchanger. By way of non-limiting example, the heat exchanger may be a shell and tube heat exchanger, an air fin-based heat exchanger, or any similar configuration. In one embodiment, it may be desirable to use such a configuration to avoid directly contacting water with the LP compressed oxidant 334, which may utilize polished or demineralized water as discussed above with respect to FIG. 18.

Figure 20:
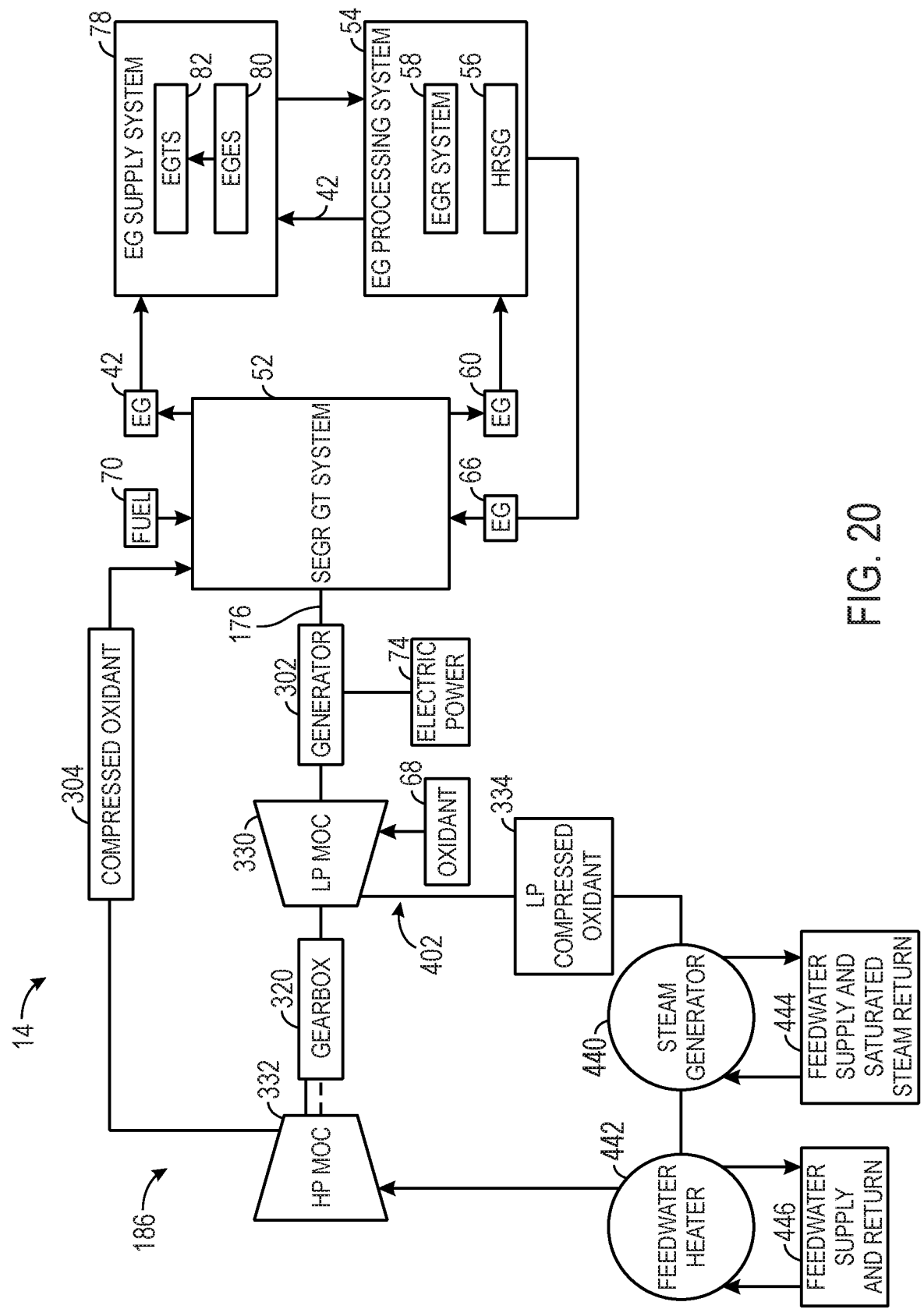
FIG. 20 is a diagram of an embodiment of the oxidant compression system of FIG. 3 having oxidant compression separated into low pressure and high pressure compressors driven by the SEGR GT system, the low pressure compressor being driven by the SEGR GT system via an electrical generator and the high pressure compressor being driven via the low pressure compressor and a gearbox, and a steam generator and feedwater heater are positioned along a low pressure compressed oxidant flow path between the low and high pressure compressors.

In another embodiment, more than one unit may be used to cool the LP compressed oxidant 334. For example, as depicted in FIG. 20, a steam generator 440 and/or a feedwater heater 442 may be disposed along the flow path 402 of the LP compressed oxidant 334 so as to provide cooling of the oxidant prior to delivery to the HP MOC 332. The steam generator 440 utilizes a feedwater supply, such as boiler feedwater, and returns a saturated steam for utilization by another machine component, such as a steam turbine. In other words, the steam generator 440 utilizes a feedwater supply and saturated steam return 444. In one embodiment, the saturated steam return generated by the steam generator 440 may be utilized by a steam turbine used to drive one or more oxidant compressors.

The feedwater heater 442, on the other hand, utilizes a feedwater supply, such as boiler feedwater, and returns heated water, thereby utilizing a feedwater supply and return 446. This heated water may be used as a feed for the steam generator 440 and/or for the HRSG 56 of the EG processing system 54.

In one embodiment, the LP MOC 330 produces the LP compressed oxidant 334 in a manner that enables the steam generator 440 to generate a medium pressure saturated steam. The medium pressure saturated steam may have a pressure of at least approximately 300 psig, such as between 350 psig and 500 psig, between 375 psig and 450 psig, or approximately 400 psig. The LP compressed oxidant 334, after passing through the steam generator 440, may then be used to heat high pressure boiler feedwater at the feedwater heater 442. In some embodiments, the LP compressed oxidant 334 may have a pressure sufficient to generate a desired pressure level of saturated steam at the steam generator 440, while then being cooled by the feedwater heater 442 such that the output of the compressed oxidant 304 by the HP MOC 332 is at least equal to, or below, a maximum output temperature of the HP MOC 332.

In addition to, or in lieu of, the embodiments discussed above, other drives (e.g., a steam turbine) may be provided along the train of the SEGR GT system 52. Such a configuration may be desirable to generate additional power, such as electric power during the operation of the turbine based service system 14. For example, electric or mechanical power generated by the steam turbine may be utilized by certain components of the oxidant compression system 186, such as by the electric motor 390 discussed above with respect to FIGS. 14-17. Such embodiments are discussed with respect to FIGS. 21-24.

Figure 21:
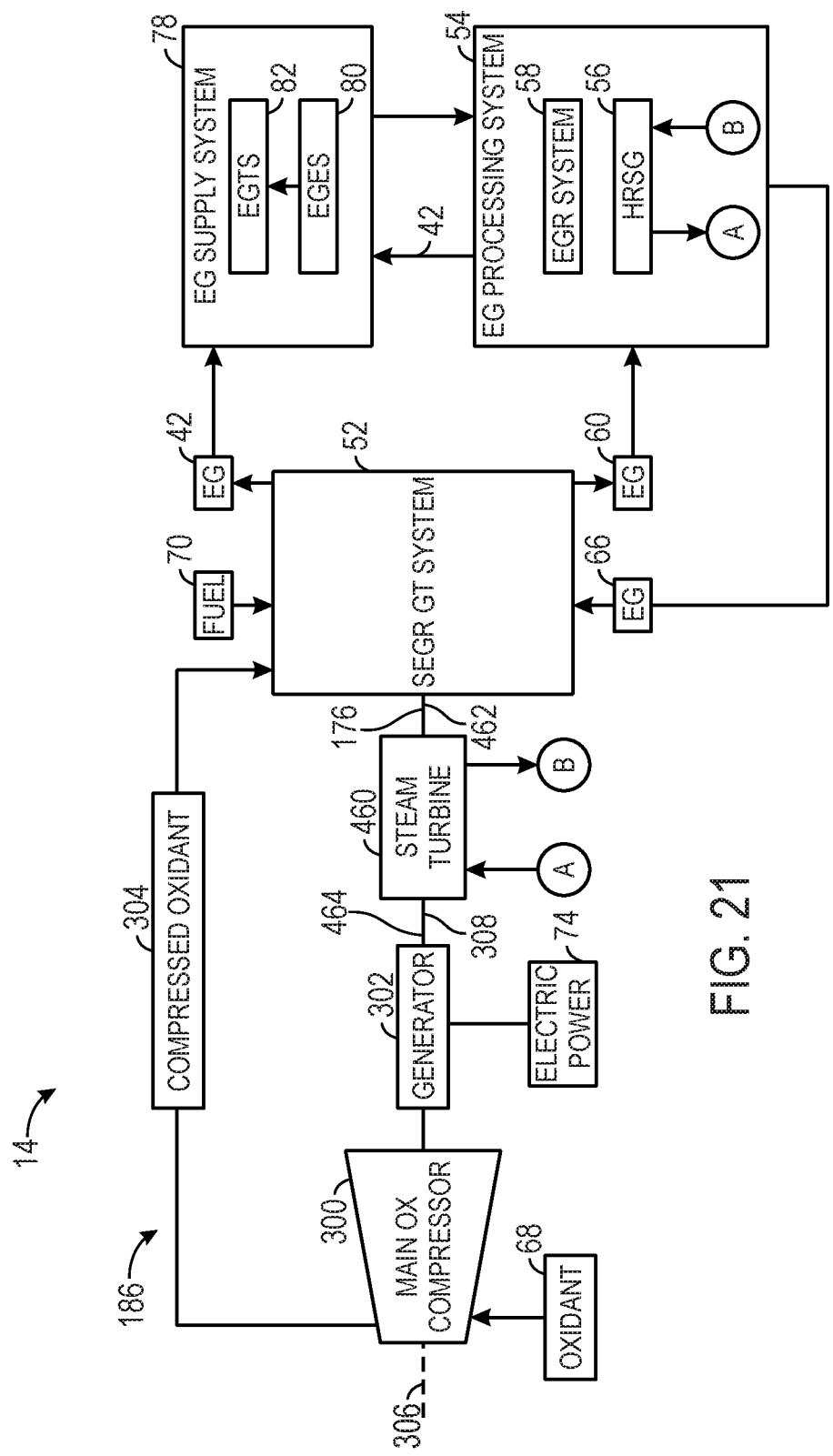
FIG. 21 is a diagram of an embodiment of the oxidant compression system of FIG. 3 having a main oxidant compressor driven by the SEGR GT system via a steam turbine and an electrical generator.

Moving now to FIG. 21, an embodiment similar to the configuration illustrated in FIG. 5 is depicted as including the main oxidant compressor 300, the generator 302, and a steam turbine 460 disposed along the line 306 of the shaft 176 of the SEGR GT system 52. In the illustrated embodiment, the steam turbine 460 is double ended, with its input shaft 462 being mechanically coupled to the shaft 176 of the SEGR GT system 52 and its output shaft 464 being mechanically coupled to the generator 302. Thus, the steam turbine 460 and the SEGR GT system 52 provide power in series to the generator 302. The generator 302 in turn provides input power to the main oxidant compressor 300, which compresses the oxidant 68 to produce the compressed oxidant 304.

While the illustrated embodiment depicts each of the machine components discussed above (MOC 300, generator 302, steam turbine 460) as being directly driven, embodiments in which one or more gearboxes are utilized are also presently contemplated. For example, a gearbox may be positioned between the SEGR GT system 52 and the steam turbine 460, between the steam turbine 460 and the generator 302, or between the generator 302 and the MOC 300, or any combination thereof. Thus, any one or a combination of the steam turbine 460, the generator 302, or the MOC 300 may be driven at a speed that is at least 10% less than the speed of the SEGR GT system 52, such as between approximately 10% and 90%, 20% and 80%, 30% and 70%, or 40% and 60%, of the speed of the SEGR GT system 52. Conversely, any one or a combination of the steam turbine 460, the generator 302, or the MOC 300 may be driven at a speed that is at least 10% greater than, such as between approximately 10% and 200%, 20% and 175%, 30% and 150%, or 40% and 125% greater than the speed of the SEGR GT system 52.

In the illustrated embodiment, the steam turbine 460 is depicted as including an input denoted as "A" and an output denoted as "B." The input A may be steam generated by one or more features of the turbine based service system 14. By way of non-limiting example, the input A may be the steam 62 generated by the HRSG 56 of the EG processing system 54. Similarly, the output B may be a condensate generated by removing work from the input steam, and the condensate may be provided to any feature which utilizes a feedwater. By way of non-limiting example, the output water or condensate B may be provided as an input stream to the HRSG 56, e.g., as a water source for steam generation. In other embodiments, the condensate may be used as a working or other cooling fluid, for example, in any one or a combination of the cooling units described above.

Furthermore, while the MOC 300 is illustrated as single unit having an axial flow configuration, the MOC 300 may be divided into any number of stages such as the LP MOC and HP MOC described above, and those stages may be axial stages, radial stages, or any suitable combination of compression stages. Furthermore, the compressors maybe housed in one or more compressor casings, and may be utilized in combination with any of the cooling features, additional drive features, gearboxes, pumps, booster compressors, and so forth, described above to enhance operational efficiency of the oxidant compression system 186.

Figure 22:
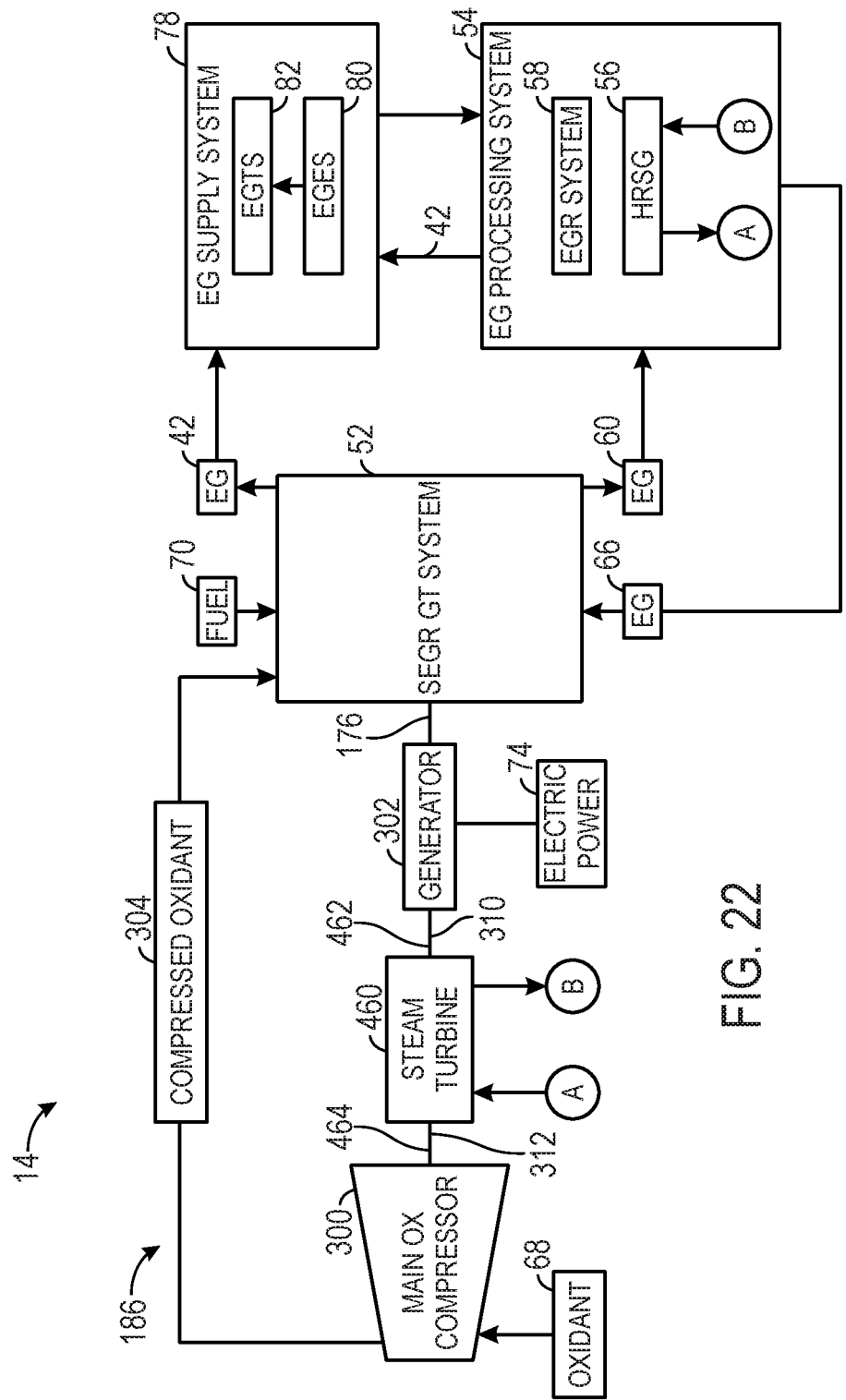
FIG. 22 is a diagram of an embodiment of the oxidant compression system of FIG. 3 having a main oxidant compressor driven by the SEGR GT system via an electrical generator and a steam turbine.

The relative positioning of the illustrated features is not limited to the particular configuration that is illustrated in FIG. 21. Rather, in some embodiments, relative positions of the machine components may be reversed or otherwise re-arranged. For example, the respective positions of the generator 302 and the steam turbine 460 may be reversed, as depicted in FIG. 22. In FIG. 22, the steam turbine 460 and the SEGR GT system 52 both directly provide power to the generator 302. In particular, the input shaft 462 of the steam turbine 460 is mechanically coupled to the output shaft 310 of the generator 302. The steam turbine 460 and the SEGR GT system 52 also provide power in series to the MOC 300. Specifically, the output shaft 464 of the steam turbine 460 is mechanically coupled to the input shaft 312 of the MOC 300. As described above, the steam turbine 460 may utilize input steam A generated by any steam-generating features, such as the HRSG 56, and may generate the condensate B therefrom, which may be returned to the steam-generating feature (e.g., the HRSG 56).

Figure 23:
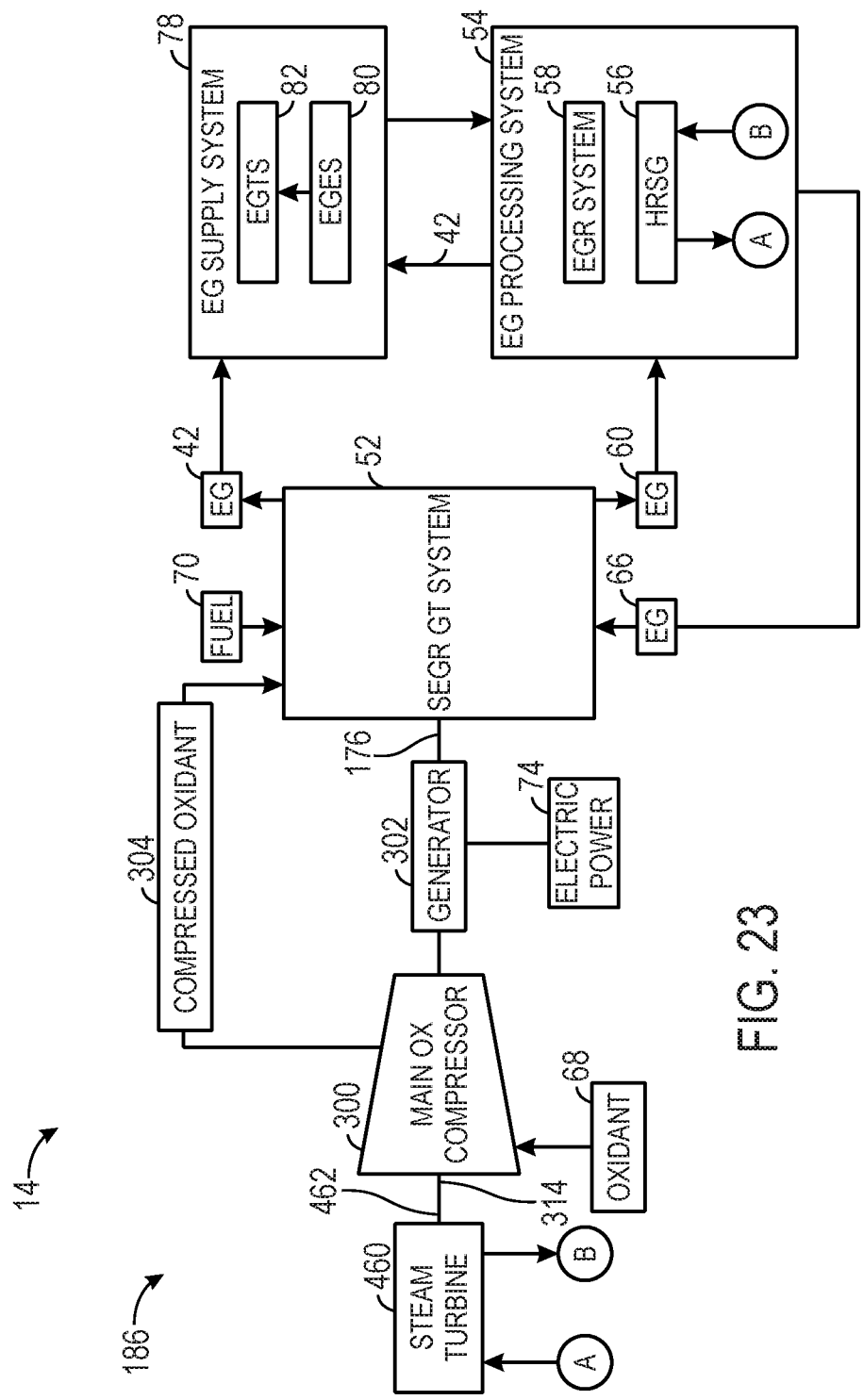
FIG. 23 is a diagram of an embodiment of the oxidant compression system of FIG. 3 having a main oxidant compressor partially driven by the SEGR GT system via an electrical generator, and the main oxidant compressor is also partially driven by a steam turbine.

In addition to reversing the respective positions of the generator 302 and the steam turbine 460, the steam turbine 460 may be positioned at any point along the train of the SEGR GT system 52. For example, as illustrated in FIG. 23, the steam turbine 460 may be located at the end of the train such that it inputs power to the output shaft 314 of the MOC 300. In other words, the output shaft 314 of the MOC 300 is mechanically coupled to the input shaft 462 of the steam generator 460. Thus, as illustrated, the generator 302 drives the MOC 300, and the SEGR GT system 52 directly drives the generator 302. Accordingly, the SEGR GT system 52 and the steam turbine 460 both provide power to the MOC 300, albeit at opposing ends.

Figure 24:
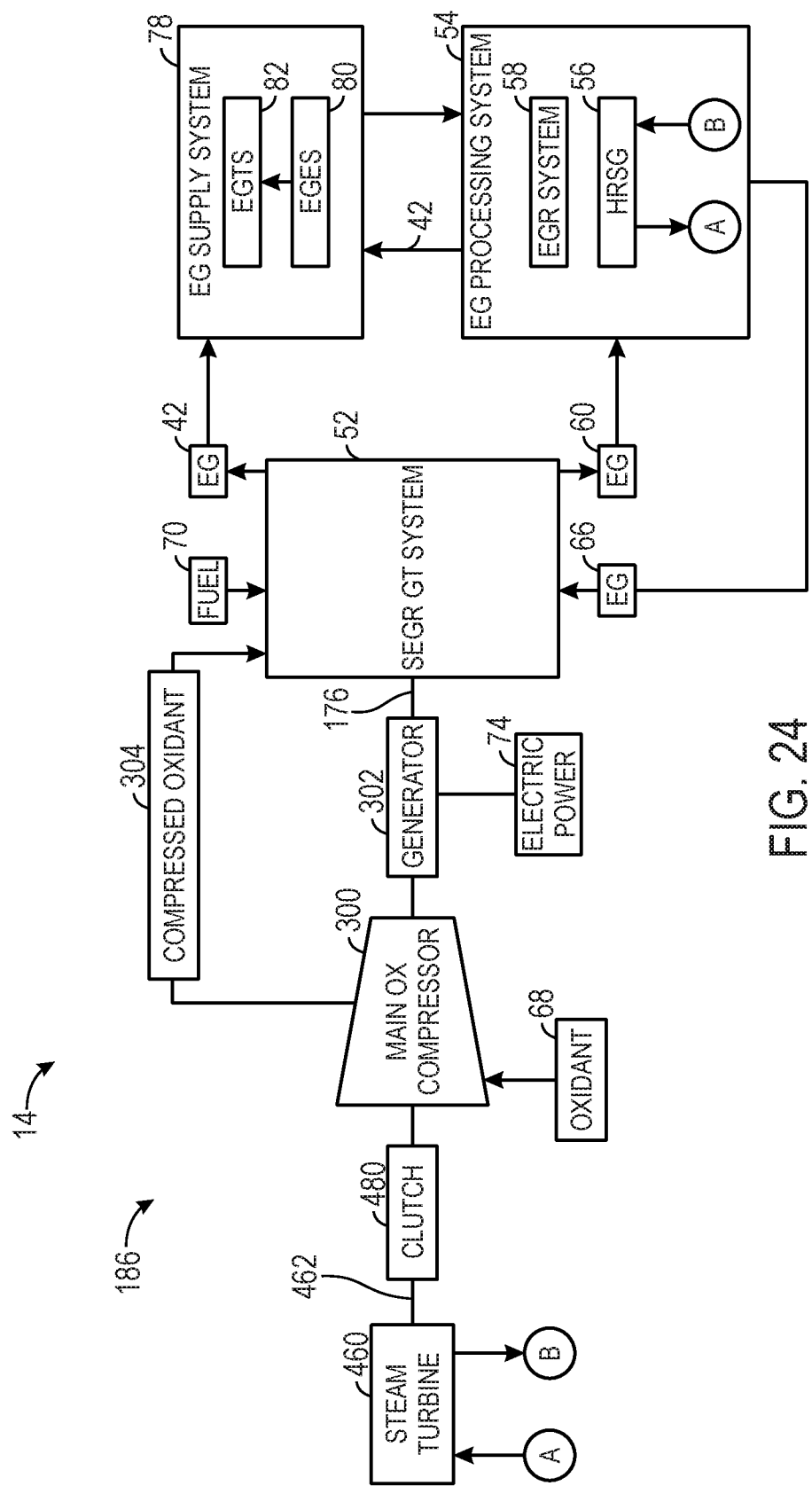
FIG. 24 is a diagram of an embodiment of the oxidant compression system of FIG. 3 having a main oxidant compressor partially driven by the SEGR GT system via an electrical generator, and the main oxidant compressor is also partially driven by a steam turbine via a clutch.

During certain situations, such as during startup, steam production by the SEGR GT system 52 may not favor operation of the steam turbine 460 (e.g., may not be sufficient to drive the steam turbine 460). Accordingly, in some embodiments, the steam turbine 460 may be decoupled from the SEGR GT system 52 during operation. For example, as illustrated in FIG. 24, the input shaft 462 of the steam turbine 460 may be coupled to a clutch 480, which is in turn coupled to the train of the SEGR GT system 52. Therefore, in situations in which the amount of the steam 62 produced by the SEGR GT system 52 (or other steam-generating component) is insufficient to drive the steam turbine 460, the action of the clutch 480 may de-couple the steam turbine 460 from the train.

ADDITIONAL DESCRIPTION

The present embodiments provide a system and method for compressing an oxidant (e.g., ambient air, oxygen-enriched air, oxygen depleted air, substantially pure oxygen) for use in exhaust gas recirculation gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1

A system, having a gas turbine system, which includes a turbine combustor; a turbine driven by combustion products from the turbine combustor; and an exhaust gas compressor driven by the turbine, wherein the exhaust gas compressor is configured to compress and supply an exhaust gas to the turbine combustor; and an exhaust gas recirculation (EGR) system, wherein the EGR system is configured to recirculate the exhaust gas along an exhaust recirculation path from the turbine to the exhaust gas compressor. The system also includes a main oxidant compression system configured to supply compressed oxidant to the gas turbine system, and the main oxidant compression system includes: a first oxidant compressor; and a first gearbox configured to enable the first oxidant compressor to operate at a first speed different from a first operating speed of the gas turbine system.

Embodiment 2

The system of embodiment 1, wherein the first gearbox includes a parallel shaft gearbox having input and output shafts that are generally parallel with one another, the input shaft is in line with a shaft line of the gas turbine system, and the output shaft is drivingly coupled to the first oxidant compressor.

Embodiment 3

The system of embodiment 1, wherein the first gearbox comprises an epicyclic gearbox having input and output shafts in line with one another and a shaft line of the gas turbine system, and the output shaft is drivingly coupled to the first oxidant compressor.

Embodiment 4

The system of any preceding embodiment, wherein the main oxidant compression system is at least partially driven by the gas turbine system, and the main oxidant compression system comprises a plurality of compression stages including the first oxidant compressor and a second oxidant compressor.

Embodiment 5

The system of any preceding embodiment, wherein the first oxidant compressor is driven by the gas turbine system through the first gearbox.

Embodiment 6

The system of any preceding embodiment, comprising: an electrical generator coupled to a shaft of the gas turbine system, wherein the first oxidant compressor is coupled to the electrical generator via the first gearbox; a drive coupled to the second oxidant compressor, wherein the drive comprises a steam turbine or an electric motor; and a second gearbox coupling the second oxidant compressor and the drive, wherein the second gearbox is configured to enable the second oxidant compressor to operate at a second speed different from a second operating speed of the drive.

Embodiment 7

The system of embodiment 4, wherein the second oxidant compressor is directly driven by the gas turbine system.

Embodiment 8

The system of embodiments 4 or 7, wherein the second oxidant compressor is disposed along a shaft line of the gas turbine system and coupled to an input shaft of an electrical generator, and the first oxidant compressor is coupled to an output shaft of the electrical generator via the first gearbox.

Embodiment 9

The system of embodiments 4, 7, or 8, having an electrical generator disposed along a shaft line of the gas turbine system, wherein the second oxidant compressor is coupled to the electrical generator and to an input shaft of the first gearbox, and the first oxidant compressor is coupled to the second oxidant compressor via the first gearbox.

Embodiment 10

The system of embodiments 4, 7, 8, or 9, having an interstage cooling system disposed along an oxidant flow path between the first and second oxidant compressors.

Embodiment 11

The system of embodiment 10, wherein the interstage cooling system includes a spray system configured to output a spray along the oxidant flow path.

Embodiment 12

The system of embodiments 10 or 11, wherein the interstage cooling system includes a heat exchanger disposed along the oxidant flow path, and the heat exchanger comprises a coolant path configured to circulate a coolant to absorb heat along the oxidant flow path.

Embodiment 13

The system of embodiments 10, 11, or 12, wherein the interstage cooling system includes a steam generator, a feed water heater, or a combination thereof, configured to cool compressed oxidant along the oxidant flow path by transferring heat to a feed water supply, wherein the steam generator is configured to generate steam for a steam turbine generator having a steam turbine coupled to an electrical generator, and the feed water heater is configured to preheat the feed water supply for eventual supply to a heat recovery steam generator (HRSG).

Embodiment 14

The system of any preceding embodiment, having a drive coupled to the first oxidant compressor, wherein the drive includes a steam turbine or an electric motor coupled to an input shaft of the first gearbox.

Embodiment 15

The system of embodiments 4, 5, 6, 7, 8, 9, 10, 11, 12, 13, or 14, wherein at least one of the first or second oxidant compressors comprises a plurality of compression stages.

Embodiment 16

The system of embodiments 4, 5, 6, 7, 8, 9, 10, 11, 12, 13, 14, or 15, wherein at least one of the first or second oxidant compressors comprises one or more axial flow compressors, one or more centrifugal compressors, or a combination thereof.

Embodiment 17

The system of embodiments 1, 2, or 3, wherein the main oxidant compression system includes a second oxidant compressor, the first and second oxidant compressors are fluidly coupled in parallel to the gas turbine system, and the second oxidant compressor is coupled to the first gearbox via the first oxidant compressor.

Embodiment 18

The system of embodiments 1, 2, or 3, having: an electrical generator coupled to a shaft of the gas turbine system;

and a drive coupled to the first oxidant compressor, wherein the drive includes a steam turbine or an electric motor, and the drive is coupled to an input shaft of the first gearbox; and wherein the main oxidant compression system has a second oxidant compressor coupled to the electrical generator via a second gearbox, and the first and second oxidant compressors are fluidly coupled in parallel to the gas turbine system.

Embodiment 19

The system of any preceding embodiment, including a stoichiometric combustion system having the turbine combustor configured to combust a fuel/oxidant mixture in a combustion equivalence ratio of 1.0 plus or minus 0.01, 0.02, 0.03, 0.04, or 0.05 fuel to oxygen in the oxidant.

Embodiment 20

The system of any preceding embodiment, including a heat recovery steam generator (HRSG) coupled to the gas turbine system, wherein the HRSG is configured to generate steam by transferring heat from the exhaust gas to a feed water.

Embodiment 21

The system of embodiment 20, wherein the HRSG is fluidly coupled to a steam turbine generator having a steam turbine coupled to an electrical generator, the steam turbine is configured to drive the first oxidant compressor via the first gearbox, to drive a second oxidant compressor of the main oxidant compression system, or any combination thereof.

Embodiment 22

The system of embodiments 20 or 21, wherein the EGR system is configured to route the exhaust gas from the turbine, through the HRSG, and back to the exhaust gas compressor, wherein the EGR system includes a blower configured to motivate the exhaust gas toward the exhaust gas compressor; a cooler configured to cool the exhaust gas; and a moisture removal unit configured to remove moisture from the exhaust gas.

Embodiment 23

The system of embodiments 20, 21, or 22, wherein the HRSG includes a catalyst configured to reduce a concentration of oxygen in the exhaust gas.

Embodiment 24

The system of any preceding embodiment, including an exhaust extraction system coupled to the gas turbine system, wherein the exhaust extraction system is configured to remove a portion of the exhaust gas from the gas turbine system.

Embodiment 25

The system of embodiment 24, including a hydrocarbon production system fluidly coupled to the exhaust extraction system, wherein the exhaust extraction system is configured to utilize the portion of the exhaust gas as a pressurized fluid for enhanced oil recovery.

Embodiment 26

The system of embodiment 24, wherein the exhaust extraction system comprises a catalyst configured to reduce a concentration of oxygen in the portion of the exhaust gas.

Embodiment 27

The system of any preceding embodiment, wherein the main oxidant compression system is configured to supply the compressed oxidant as atmospheric air, oxygen enriched air having between approximately 21% and 80% by volume oxygen, oxygen depleted air having between approximately 1% and 21% by volume oxygen, or substantially pure oxygen comprising greater than 80% by volume oxygen.

Embodiment 28

A system including a gas turbine system, having: a turbine combustor; a turbine driven by combustion products from the turbine combustor; and an exhaust gas compressor driven by the turbine, wherein the exhaust gas compressor is configured to compress and supply an exhaust gas to the turbine combustor. The gas turbine system also includes an exhaust gas recirculation (EGR) system, wherein the EGR system is configured to recirculate the exhaust gas along an exhaust recirculation path from the turbine to the exhaust gas compressor. The system also includes a main oxidant compression system configured to supply compressed oxidant to the gas turbine system, and the main oxidant compression system has a first oxidant compressor; and a second oxidant compressor, wherein the first and second oxidant compressors are driven by the gas turbine system.

Embodiment 29

The system of embodiment 28, wherein an oxidant outlet of the second oxidant compressor is fluidly coupled to an oxidant inlet of the first oxidant compressor.

Embodiment 30

The system of embodiments 28 or 29, wherein the first and second oxidant compressors are driven by the gas turbine system via an electrical generator drivingly coupled to a shaft of the gas turbine system, wherein the second oxidant compressor is drivingly coupled to an output shaft of the electrical generator.

Embodiment 31

The system of embodiments 28, 29, or 30, wherein the first oxidant compressor comprises a centrifugal compressor and the second oxidant compressor comprises an axial flow compressor.

Embodiment 32

The system of embodiments 28, 29, 30, or 31, comprising a first gearbox coupling the first and second oxidant compressors, wherein the second oxidant compressor is drivingly coupled to an input shaft of the first gearbox and the first oxidant compressor is drivingly coupled to an output shaft of the first gearbox.

Embodiment 33

The system of embodiments 28 or 29, wherein the first oxidant compressor is driven by the gas turbine system via an electrical generator, wherein the second oxidant compressor is drivingly coupled to an input shaft of the electrical generator and the first oxidant compressor is drivingly coupled to an output shaft of the electrical generator.

Embodiment 34

The system of embodiments 28, 29, 30, 31, 32, or 33, including an interstage cooling system disposed along an oxidant flow path between the first and second oxidant compressors.

Embodiment 35

The system of embodiment 34, wherein the interstage cooling system includes a spray system configured to output a spray along the oxidant flow path.

Embodiment 36

The system of embodiments 34 or 35, wherein the interstage cooling system includes a heat exchanger disposed along the oxidant flow path, and the heat exchanger includes a coolant path configured to circulate a coolant to absorb heat along the oxidant flow path.

Embodiment 37

The system of embodiments 34, 35, or 36, wherein the interstage cooling system includes a steam generator, a feed water heater, or a combination thereof, configured to cool compressed oxidant along the oxidant flow path by transferring heat to a feed water supply, wherein the steam generator is configured to generate steam for a steam turbine generator having a steam turbine coupled to an electrical generator, and the feed water heater is configured to preheat the feed water supply for eventual supply to a heat recovery steam generator (HRSG).

Embodiment 38

The system of embodiments 28, 30, 31, 32, 33, 34, 35, 36, or 37, wherein the main oxidant compression system includes a first gearbox configured to enable the first oxidant compressor to operate at a first speed different from a first operating speed of the gas turbine system, the first and second oxidant compressors are fluidly coupled in parallel to the gas turbine system, and the second oxidant compressor is coupled to the first gearbox via the first oxidant compressor.

Embodiment 39

The system of embodiments 28, 29, 30, 31, 32, 33, 34, 35, 36, 37, or 38, including a stoichiometric combustion system having the turbine combustor configured to combust a fuel/oxidant mixture in a combustion equivalence ratio of 1.0 plus or minus 0.01, 0.02, 0.03, 0.04, or 0.05 fuel to oxygen in the oxidant.

Embodiment 40

The system of embodiments 28, 29, 30, 31, 32, 33, 34, 35, 36, or 38, including a heat recovery steam generator (HRSG) coupled to the gas turbine system, wherein the HRSG is configured to generate steam by transferring heat from the exhaust gas to a feed water.

Embodiment 41

The system of embodiment 40, wherein the HRSG is fluidly coupled to a steam turbine generator having a steam turbine coupled to an electrical generator, the steam turbine is configured to drive the first oxidant compressor via the first gearbox, to drive the second oxidant compressor of the main oxidant compression system, or any combination thereof.

Embodiment 42

The system of embodiments 38, 40, or 41, wherein the EGR system is configured to route the exhaust gas from the turbine, through the HRSG, and back to the exhaust gas compressor, wherein the EGR system includes: a blower configured to motivate the exhaust gas toward the exhaust gas compressor; a cooler configured to cool the exhaust gas; and a moisture removal unit configured to remove moisture from the exhaust gas.

Embodiment 43

The system of embodiments 38, 40, 41, or 42, wherein the HRSG comprises a catalyst configured to reduce a concentration of oxygen in the exhaust gas.

Embodiment 44

The system of embodiments 28, 29, 30, 31, 32, 33, 34, 35, 36, 37, 38, 39, 40, 41, 42, or 43, including an exhaust extraction system coupled to the gas turbine system, wherein the exhaust extraction system is configured to remove a portion of the exhaust gas from the gas turbine system.

Embodiment 45

The system of embodiment 44, including a hydrocarbon production system fluidly coupled to the exhaust extraction system, wherein the exhaust extraction system is configured to utilize the portion of the exhaust gas as a pressurized fluid for enhanced oil recovery.

Embodiment 46

The system of embodiments 44 or 45, wherein the exhaust extraction system comprises a catalyst configured to reduce a concentration of oxygen in the portion of the exhaust gas.

Embodiment 47

The system of embodiments 28, 29, 30, 31, 32, 33, 34, 35, 36, 37, 38, 39, 40, 41, 42, 43, 44, 45, 46, or 47, wherein the main oxidant compression system is configured to supply the compressed oxidant as atmospheric air, oxygen enriched air having between approximately 21% and 80% by volume oxygen, oxygen depleted air having between approximately 1% and 21% by volume oxygen, or substantially pure oxygen comprising greater than 80% by volume oxygen.

Embodiment 48

A system, including a gas turbine system, having: a turbine combustor; a turbine driven by combustion products from the turbine combustor; and an exhaust gas compressor driven by the turbine, wherein the exhaust gas compressor is configured to compress and supply an exhaust gas to the turbine combustor; and an exhaust gas recirculation (EGR) system, wherein the EGR system is configured to recirculate the exhaust gas along an exhaust recirculation path from the turbine to the exhaust gas compressor. The system also includes a main oxidant compression system configured to supply compressed oxidant to the gas turbine system, and the main oxidant compression system comprises one or more oxidant compressors; a heat recovery steam generator (HRSG) coupled to the gas turbine system, wherein the HRSG is configured to generate steam by transferring heat from the exhaust gas to a feed water, and the exhaust recirculation path of the EGR system extends through the HRSG; and a steam turbine disposed along a shaft line of the gas turbine system and at least partially driven by the steam from the HRSG, wherein the steam turbine is configured to return condensate as at least a portion of the feedwater to the HRSG.

Embodiment 49

The system of embodiment 48, wherein at least one oxidant compressor of the one or more oxidant compressors of the main oxidant compression system is disposed along the shaft line of the gas turbine system.

Embodiment 50

The system of embodiments 48 or 49, wherein the steam turbine is disposed along the shaft line between the main oxidant compression system and the gas turbine system.

Embodiment 51

The system of embodiments 49 or 50, having an electrical generator disposed between the steam turbine and the at least one oxidant compressor of the main oxidant compression system.

Embodiment 52

The system of embodiments 48, 49, 50, or 51, having an electrical generator disposed between the steam turbine and the gas turbine system, wherein the gas turbine system is mechanically coupled to an input shaft of the electrical generator and the steam turbine is mechanically coupled to an output shaft of the electrical generator.

Embodiment 53

The system of embodiments 48, 49, 50, 51, or 52, wherein the main oxidant compression system is driven by the gas turbine system, and the main oxidant compression system is positioned along the shaft line between the steam turbine and the gas turbine system.

Embodiment 54

The system of embodiments 49, 50, 51, 52, or 53, including a clutch disposed between the at least one compressor of the main oxidant compression system and the steam turbine, wherein the clutch enables the steam turbine to operate at the same speed as the gas turbine system when engaged, and to operate separate from the gas turbine system when not engaged.

Embodiment 55

The system of embodiments 48, 49, 50, 51, 52, 53, or 54, wherein the main oxidant compression system includes a plurality of compressors in a series arrangement of compression.

Embodiment 56

The system of embodiments 48, 49, 50, 51, 52, 53, or 54, wherein the main oxidant compression system comprises a plurality of compressors in a parallel arrangement of compression.

Embodiment 57

The system of embodiments 48, 49, 50, 51, 52, 53, 54, 55, or 56, wherein the main oxidant compression system comprises at least one oxidant compressor drivingly coupled to a speed-reducing or speed-increasing gearbox that enables the at least one oxidant compressor to operate at a speed that is different from an operating speed of the gas turbine system.

Embodiment 58

The system of embodiments 48, 49, 50, 51, 52, 53, 54, 55, 56 or 57, wherein the HRSG comprises a catalyst configured to reduce a concentration of oxygen in the exhaust gas.

Embodiment 59

The system of embodiments 48, 49, 50, 51, 52, 53, 54, 55, 56, 57, or 58, including an exhaust extraction system coupled to the gas turbine system, wherein the exhaust extraction system is configured to remove a portion of the exhaust gas from the gas turbine system.

Embodiment 60

The system of embodiment 59, including a hydrocarbon production system fluidly coupled to the exhaust extraction system, wherein the exhaust extraction system is configured to utilize the portion of the exhaust gas as a pressurized fluid for enhanced oil recovery.

Embodiment 61

The system of embodiments 59 or 60, wherein the exhaust extraction system includes a catalyst configured to reduce a concentration of oxygen in the portion of the exhaust gas.

Embodiment 62

The system of embodiments 48, 49, 50, 51, 52, 53, 54, 55, 56, 57, 58, 59, 60, or 61, wherein the main oxidant compression system is configured to supply the compressed oxidant as atmospheric air, oxygen enriched air having between approximately 21% and 80% by volume oxygen, oxygen depleted air having between approximately 1% and 21% by volume oxygen, or substantially pure oxygen comprising greater than 80% by volume oxygen.

Embodiment 63

A system, including: a gas turbine system, having: a turbine combustor; a turbine driven by combustion products from the turbine combustor; and an exhaust gas compressor driven by the turbine, wherein the exhaust gas compressor is configured to compress and supply an exhaust gas to the turbine combustor; and an exhaust gas recirculation (EGR) system, wherein the EGR system is configured to recirculate the exhaust gas along an exhaust recirculation path from the turbine to the exhaust gas compressor. The system also includes a main oxidant compression system comprising one or more oxidant compressors, wherein the one or more oxidant compressors are separate from the exhaust gas compressor, and the one or more oxidant compressors are configured to supply all compressed oxidant utilized by the turbine combustor in generating the combustion products.

Embodiment 64

The system of any preceding embodiment, wherein the combustion products have substantially no unburnt fuel or oxidant remaining.

Embodiment 65

The system of any preceding embodiment, wherein the combustion products have less than approximately 10, 20, 30, 40, 50, 60, 70, 80, 90, 100, 200, 300, 400, 500, 1000, 2000, 3000, 4000, or 5000 parts per million by volume (ppmv) of oxidant unburnt fuel, nitrogen oxides (e.g., $NO_X$), carbon monoxide (CO), sulfur oxides (e.g., $SO_X$), hydrogen, and other products of incomplete combustion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gas turbine system, comprising:
  a turbine combustor;
  a turbine driven by combustion products from the turbine combustor; and
  an exhaust gas compressor driven by the turbine, wherein the exhaust gas compressor is configured to compress and supply an exhaust gas to the turbine combustor;
an exhaust gas recirculation (EGR) system, wherein the EGR system is configured to recirculate the exhaust gas along an exhaust recirculation path from the turbine to the exhaust gas compressor;
a main oxidant compression system configured to supply compressed oxidant to the gas turbine system, and the main oxidant compression system comprises:
  a first oxidant compressor coupled to a shaft of the gas turbine system, such that the first oxidant compressor is at least partially driven by the gas turbine system; and
  a second oxidant compressor;
an electrical generator coupled to the shaft of the gas turbine system;
a drive coupled to the second oxidant compressor, wherein the drive comprises a steam turbine or an electric motor; and
a gearbox coupling the drive to the second oxidant compressor, wherein the gearbox is configured to enable the second oxidant compressor to operate at a speed different from an operating speed of the drive.

2. The system of claim 1, wherein the first oxidant compressor and the second oxidant compressor are configured to operate in a series configuration of compression.

3. The system of claim 2, wherein the first oxidant compressor is a low pressure oxidant compressor and the second oxidant compressor is a high pressure oxidant compressor.

4. The system of claim 1, wherein the drive coupled to the second oxidant compressor comprises the steam turbine.

5. The system of claim 4, wherein the EGR system comprises a heat recovery steam generator configured to receive a stream of water to generate steam via a heat exchange relationship with the exhaust gas.

6. The system of claim 5, wherein the heat recovery generator is configured to supply the steam to the steam turbine, and wherein the steam turbine is configured to drive the second oxidant compressor via electric power generated from the steam.

7. The system of claim 1, wherein the drive is the electric motor, and wherein the electric motor receives electric power from the generator to drive the second oxidant compressor.

8. The system of claim 1, wherein the gearbox comprises a parallel shaft gearbox having input and output shafts that are generally parallel with one another, or wherein the gearbox comprises an epicyclic gearbox having input and output shafts in line with one another.

9. The system of claim 1, comprising a stoichiometric combustion system having the turbine combustor configured to combust a fuel/oxidant mixture in a combustion equivalence ratio of between 0.95 and 1.05 fuel to oxygen in the oxidant.

10. A system, comprising:
a gas turbine system, comprising:
  a turbine combustor;
  a turbine driven by combustion products from the turbine combustor; and
  an exhaust gas compressor driven by the turbine, wherein the exhaust gas compressor is configured to compress and supply an exhaust gas to the turbine combustor;
an exhaust gas recirculation (EGR) system, wherein the EGR system is configured to recirculate the exhaust gas along an exhaust recirculation path from the turbine to the exhaust gas compressor; and
a main oxidant compression system configured to supply compressed oxidant to the gas turbine system, and the main oxidant compression system comprises:
  a first oxidant compressor coupled to a shaft of the turbine of the gas turbine system in series, such that the first oxidant compressor is at least partially driven by the gas turbine system;
  a second oxidant compressor coupled to the shaft of the turbine of the gas turbine system in series between the first oxidant compressor and the gas turbine, such that the second oxidant compressor is at least partially driven by the gas turbine system; and
  a gearbox coupled to the shaft of the turbine of the gas turbine system between the first oxidant compressor and the second oxidant compressor, wherein the gearbox is configured to enable the first oxidant compressor to operate at a speed different from the second oxidant compressor.

11. The system of claim 10, wherein the first oxidant compressor receives compressed oxidant from the second oxidant compressor.

12. The system of claim 11, wherein the first oxidant compressor is a high pressure oxidant compressor and the second oxidant compressor is a low pressure oxidant compressor.

13. The system of claim 11, wherein the first oxidant compressor is a centrifugal compressor and the second oxidant compressor is an axial flow compressor.

14. The system of claim 10, comprising a stoichiometric combustion system having the turbine combustor configured to combust a fuel/oxidant mixture in a combustion equivalence ratio of between 0.95 and 1.05 fuel to oxygen in the oxidant.

15. The system of claim 10, wherein the gearbox comprises a speed-increasing gearbox.

16. A system, comprising:
a gas turbine system, comprising:
a turbine combustor;
a turbine driven by combustion products from the turbine combustor; and
an exhaust gas compressor driven by the turbine, wherein the exhaust gas compressor is configured to compress and supply an exhaust gas to the turbine combustor;
an exhaust gas recirculation (EGR) system, wherein the EGR system is configured to recirculate the exhaust gas along an exhaust recirculation path from the turbine to the exhaust gas compressor;
a main oxidant compression system configured to supply compressed oxidant to the gas turbine system, and the main oxidant compression system comprises:
a first oxidant compressor coupled to a shaft of the gas turbine system, such that the first oxidant compressor is at least partially driven by the gas turbine system; and
a second oxidant compressor configured to receive partially compressed oxidant from the first oxidant compressor to supply compressed oxidant to the gas turbine system; and
a steam turbine coupled to the second oxidant compressor and configured to at least partially drive the second oxidant compressor, wherein the steam turbine is coupled to the second oxidant compressor via a gearbox, and wherein the gearbox is configured to enable the second oxidant compressor to operate at a speed different from an operating speed of the steam turbine.

17. The system of claim 16, wherein the first oxidant compressor is an axial flow compressor and the second oxidant compressor is an axial flow compressor.

18. The system of claim 16, wherein the gas turbine system comprises a heat recovery steam generator configured to receive a stream of water to generate steam via a heat exchange relationship with the exhaust gas.

19. The system of claim 18, wherein the heat recovery generator is configured to supply the steam to the steam turbine, and wherein the steam turbine is configured to at least partially drive the second oxidant compressor via electric power generated from the steam.

20. The system of claim 16, wherein the first oxidant compressor is a low pressure oxidant compressor and the second oxidant compressor is a high pressure oxidant compressor.

* * * * *